(12) United States Patent
Schutzer

(10) Patent No.: US 6,292,789 B1
(45) Date of Patent: Sep. 18, 2001

(54) METHOD AND SYSTEM FOR BILL PRESENTMENT AND PAYMENT

(75) Inventor: Daniel Schutzer, Scarsdale, NY (US)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 09/137,812

(22) Filed: Aug. 21, 1998

Related U.S. Application Data

(60) Provisional application No. 60/056,399, filed on Aug. 26, 1997, provisional application No. 60/065,474, filed on Nov. 19, 1997, and provisional application No. 60/067,162, filed on Dec. 4, 1997.

(51) Int. Cl.[7] .................................................. G06F 17/60
(52) U.S. Cl. ............................... 705/40; 705/39; 705/42; 705/34
(58) Field of Search .................................. 705/34, 39, 40, 705/42

(56) References Cited

U.S. PATENT DOCUMENTS

| | | | |
|---|---|---|---|
| 5,220,501 | 6/1993 | Lawlor et al. ........................ | 380/24 |
| 5,465,206 | 11/1995 | Hilt et al. ............................. | 705/40 |
| 5,473,143 | 12/1995 | Vak et al. ............................. | 235/380 |
| 5,649,117 | * 7/1997 | Landry ................................. | 705/40 |
| 5,677,955 | * 10/1997 | Doggett et al. ...................... | 380/24 |
| 5,699,528 | 12/1997 | Hogan ................................. | 705/40 |
| 5,794,221 | * 8/1998 | Egendorf ............................. | 705/40 |
| 5,832,460 | * 11/1998 | Bednar et al. ....................... | 705/27 |
| 5,884,288 | * 3/1999 | Chang et al. ........................ | 705/40 |
| 5,963,925 | * 10/1999 | Kolling et al. ...................... | 705/40 |
| 5,999,916 | * 12/1999 | Peters ................................... | 705/34 |
| 6,049,786 | * 4/2000 | Smorodinsky ....................... | 705/40 |
| 6,070,150 | * 5/2000 | Remington et al. ................. | 705/34 |
| 6,185,544 | * 2/2001 | Sakamoto et al. .................. | 705/40 |

FOREIGN PATENT DOCUMENTS

| | | | |
|---|---|---|---|
| 0 745 947 A2 | 4/1996 | (EP) .............................. | G06F/17/60 |
| WO 97/16798 | 5/1997 | (WO) ............................. | G05F/157/00 |

OTHER PUBLICATIONS

Anon., "Another Player Enters the Bill Presentment Game," Report on Home Banking and financial Services, vol. 2, No. 12, p. 3, Mar. 1997.*

The Microsoft Press Computer Dictionary, Third Edition, Microsoft Press, Redmond, p. 156, 1997.*

Examiner's First Report on Patent Application No. 91117/98 issued by the Australian Patent Office, dated Oct. 27, 2000 (mailing date).

International Preliminary Examination Report issued by the Patent Cooperation Treaty for Application No. PCT/US98/17329, Jul. 24, 2000 (Date of Mailing).

International Search Report, dated Dec. 17, 1998.

(List continued on next page.)

Primary Examiner—Robert W. Downs
Assistant Examiner—Nicholas David Rosen
(74) Attorney, Agent, or Firm—George T. Marcou; Kilpatrick Stockton LLP

(57) ABSTRACT

A method and system for presentment of bills on a computer network includes a biller account hosted on a server of a bill service provider for receiving a bill file from a biller that includes bill data. The biller account automatically formats a bill for a consumer from the bill data. The bill file from which the bill is automatically formatted includes a bill template and bill content and may also include a temporary resource. A document server coupled to the bill service provider's server receives and automatically stores the formatted bill in a storage location. The formatted bill consists of an electronic mail message, and the storage location is an electronic mailbox. The stored bill is accessed and displayed by the consumer on a consumer terminal coupled to the document server. The consumer may pay the bill through a bill payment processor.

11 Claims, 32 Drawing Sheets

OTHER PUBLICATIONS

Goradia et al. Netbill 1994 Presentation. Carnegie Mellon University, Information Networking Institute. 1994, 91 pages, especially p. 2, pp. 4–6, and pp. 9–16.

Whalley, Cary, Payment Systems, Bill Payment and Presentment. National Automated Clearing House Association. Jul. 8, 1998, 32 Pages, especially pp. 17 and 21–29.

Report on Home Banking & Financial Services Newsletter article, Another Player Enters the Bill Presentment Game (Online Resources & Communications with Electronic Funds & Data Corp. and American Payment Systems to Develop Online Bill Presentment and Bill Payment Service), Mar. 28, 1997, v. 2, n 12, p. 3.

PCT Written Opinion dated Sep. 10, 1999.

* cited by examiner

FIG 30

BILL TEMPLATE

CONTENTS

<u>Statement Content</u>

- Transaction ID
- Billing Data
- Remittance Information
  - ⇨ *Payment Recipient (Biller/BPP)*
  - ⇨ *Amount Due, Due Date*
  - ⇨ *Minimum Due, Delinquency Date*

<u>Routing Information</u>

- Biller
- Bill Preparer (e.g. BSP)
- Bill Presenter (e.g. CSP)
- Bill Recipient (Customer)

<u>Tracking Information</u>

- Entity/entities (e.g. BSP/CSP/Biller) to be informed about the Bill Cycle Status at different stages

200

ENCLOSURES

- Statutory/Regulatory
- Urgent
- Informational (optional)
- Marketing
- URL or Text Content

202

ENCLOSURE TEMPLATE

FIG 31

| | | | | | | | |
|---|---|---|---|---|---|---|---|
| Consumer-CSP Interaction | WWW | Email | ATM | PFM | Home/PC Banking | Phone | Paper Bills |
| Presentment/Payment | Payment - Credit Cards, Debit Cards, Checks, E-Check, e-cash | | | | Presentment - BITS | | |
| Financial Data Interchange | FSML | | BIPS, NPP | | | Bill Definition Language | |
| Display | HTML/XML | | | | | | |
| Security | Certificates-X.509 | | | | Digital Signatures PKCS#7 | | |
| Application | Directory-LDAP | HTTP | | FTP | POP/IMAP SMTP | | S/MIME SSL |
| Medium | Internet | | | | Dedicated Communication/Data Lines | | |
| Transport | TCP/IP | | | | | | |

FIG 32

METHOD AND SYSTEM FOR BILL PRESENTMENT AND PAYMENT

This application claims priority to applicant's copending applications titled OPEN BILL PRESENTMENT & PAYING STANDARD SPECIFICATION having U.S. Ser. No. 60/056,399 filed Aug. 26, 1997, OPEN BILL PRESENTMENT & PAYING STANDARD SPECIFICATION having U.S. Ser. No. 60/065,474 filed Nov. 19, 1997, and OPEN BILL PRESENTMENT AND PAYING STANDARD SPECIFICATION having U.S. Ser. No. 60/067,162 filed Dec. 4, 1997.

FIELD OF THE INVENTION

The present invention generally relates to the field of computerized bill presentment and more particularly to the electronic delivery of a bill from any biller to any consumer and for electronic delivery of subsequent payment from the consumer to the biller.

BACKGROUND OF THE INVENTION

Currently 10% of households are users of the internet for activities other than e-mail. Although estimates of the number of households currently using a computer for bill paying vary widely, it is estimated that by the year 2000, about 10% of the population will use a computer for bill paying. Regardless, all users still receive bills the "old fashioned" way through the U.S. mail, requiring physical retrieval, sorting, prioritizing, and placing beside the computer or the telephone for payment.

Paying bills is one of the major financial activities of consumers and businesses, and the task is unattractive, time consuming and recurring. Each bill paid by mail costs the consumer a minimum of postage plus checking charges, and each bill sent by mail costs the biller a minimum of postage plus printing charges. It is estimated that around 19 billion bills per year are sent and paid today, not including many non-bill statements. The use of technology for electronic bill presentment and payment can reduce the cost of the billing and payment process for up to 100 million U.S. households and their vendors and service providers.

There is a current need to provide a single, flexible approach to electronic bill presentment and payment that is acceptable to financial institutions and the financial services industry, that enables billers and consumers respectively to present and pay a majority of bills electronically, that meets the long term needs of financial institutions and their customers, and that enables financial institutions to provide a range of value-added services for their customers.

There is a further need for an electronic bill presentment and payment system which provides consumers with the ability to transact bill payments across delivery channels such as the internet, automated teller machines/customer activated terminals (ATM/CAT's), interactive television, and telephone; which enables consumers to determine how or if their financial data is to be used; and which supports the same range of payment instruments such as credit cards, checks or cash found in the physical world.

There is also a need for a computerized bill presentment and payment system which provides billers with control over how their bills are presented and how their financial data is used; which provides flexibility and extensibility to adapt to frequent technological advances; and which provides a high quality, trusted, low cost alternative to existing bill and consumer service providers.

SUMMARY OF THE INVENTION

It is a feature and advantage of the present invention to provide an electronic bill presentment system which allows many parties to participate, so billers can reach all electronic customers, and consumers can receive bills from all billers in one system.

It is a further feature and advantage of the present invention to provide an electronic bill presentment system which is easy to use, makes use of software that is easy to use, and which can serve many parties, so that billers and consumers are not faced with a system available for only a small portion of their bills.

It is a further feature and advantage of the present invention to provide an electronic bill presentment system able to service consumers with basic computer set-ups and other devices such as ATM/CAT's and set-top boxes.

It is a further feature and advantage of the present invention to provide an electronic bill presentment system capable of taking data from billers' legacy systems and reformatting and transmitting the directly.

It is a further feature and advantage of the present invention to provide an electronic bill presentment system that is less expensive for billers to use than prior art billing methods.

It is a further feature and advantage of the present invention to provide an electronic bill presentment system that is inexpensive for consumers to use.

It is a further feature and advantage of the present invention to provide a user-friendly, well integrated electronic bill presentment/bill payment system for consumers who have payment accounts at any financial institution such as a bank or brokerage.

It is a further feature and advantage of the present invention to provide an accurate, bulk processing electronic bill presentment system for large billers with many billing accounts.

It is a further feature and advantage of the present invention to provide secure electronic billing transports that are interoperable with other secure transports at low cost, streamlined, and with high reliability and uptime standards.

It is a further feature and advantage of the present invention to provide an electronic bill presentment system which presents bills to consumers on a variety of communication devices, such as computers, interactive television sets, or on an audio basis by telephone, and enables billers to send graphics, variable data and enclosures of various types.

Electronic bill presentment according to the present invention is an enhancement to electronic bill payment that adds considerable value to the customer proposition and allows a tracking capability for bills received and paid. It also allows customers to store bills electronically and manipulate them, which has not been previously possible. Electronic bill payment is done between consumers and their banks or other service providers, but electronic bill presentment involves the biller and its service provider as well, so the electronic bill presentment system of the present invention involves more entities, namely consumers, businesses and networks. The systems and operational flows of the present invention are designed to meet the needs of both consumers and billers.

The electronic bill presentment and payment system of the present invention is designed to accommodate all the possible entities currently involved in the bill presentment and payment process, and to add value to all parties over the current system. The system of the present invention streamlines the entire process, reduces the delay, cost and manual processing involved, and also provides increased control and better access to information for all the parties. The system of the present invention also provides the ability to deal with special handling of bills, including priority handling, automatic filing into folders, and filters to screen unwanted messages. The system of the present invention further enables billers and consumers to consolidate bills and bill presentment. The system of the present invention additionally allows billers to personally customize and control the content and format of the bill presentment within the constraints of the presentation device selected by the consumer, including the ability to include graphics, to sort the information in any arbitrary order, to subtotal, and to insert enclosures.

The electronic bill presentment and payment system of the present invention enables one-stop retrieval and payment of bills by consumers and provides consumers with greater control over their financial data by providing a centralized financial information repository on a mailbox server. The system of the present invention also provides billers with efficiency by enabling access to consumers from a number of financial institutions, including banks; provides billers with control over bill presentation and links between payment and invoice; and provides billers with faster and lower cost bill presentment. Further, the bill presentment and payment system of the present invention provides bill and consumer service providers with a standard interface that simplifies integration with existing financial institution, bill and consumer service provider systems.

In the electronic bill presentment and payment system of the present invention, the parties have distinctive roles and responsibilities, including the consumer, the consumer service provider, the directory service or commerce document server, the bill service provider, and the biller. A single institution may act in multiple roles. For example, a single financial institution such as a bank may act as the consumer service provider, the directory service, and the bill service provider. The consumer is responsible for initial sign up for bill presentment service. The consumer service provider provides secure electronic mail for the consumer, presents bills in its home banking software, and supports the consumer with payment choices. The directory service or commerce document server routes bills to the correct payer or consumer service provider, provides an up-to-date directory, and maintains a link to other directory services. The bill service provider assists in formatting bills. The biller defines bill content and establishes relationships with advertisers.

The bill presentment system of the present invention allows billers to prepare or format a bill file, including all data in the bills to be generated for a given day, and to send the bill file to the biller's bill service provider. The bill service provider receives and re-formats the bill file and routes bills for a particular consumer to the consumer's service provider by means of a billing and payment transport utility. The transport securely routes to and stores the bill in for the consumer or the consumer's service provider. Preferably, the consumer will have signed up with a consumer service provider in advance. The consumer service provider presents the bill to the consumer and has a system linked for payment process. The bill is typically stored and presented to the consumer, along with the consumer's other bills, in the consumer's electronic mailbox and/or the consumer's personal internet web page.

A consumer mailbox address facilitates easy identification and distribution to any given consumer. The consumer mailbox address is an internet address not unlike an e-mail address. Each consumer has an account; each biller or bill service provider has a domain; and each function within that domain has an account. When a participant asks to see the bill, a query returns one or more bill content objects to the requesting process. The process may be implemented to sequentially ask for renderings or may create a summary for an associated summary template. Either way, the target content contains identifying information that will allow a match to a template and a subsequent merge. During a merge, the bill template reads its description sequentially and writes it "as is" to the output file until it encounters an insert tag. The template then "asks" its associated content for the value of the name of the tag that it encountered. The return value is then swapped in place of the insert tag and written to the output file.

Temporary or time dependent resources have relevance as a function of time. Enclosures may be temporary resources in that they may contain an offer that is extended for a given period of time, but it may be desirable to reference bill data for a long period for historical inquiry. A temporary resource has a start date and an end date. A temporary resource also has a relative file name that need not be unique between active periods, but must not overlap. Templates and resources are unique within a given originator, since they are stored by originator. Practically everything other than bill content is a type of resource, including templates. Therefore, the bill content is sent first to the commerce document server by the bill service provider. The bill content contains references to the resources it uses rather than the actual resources. This allows resources to be sent only once for network efficiency and also reduces storage requirements. When the commerce document server determines that a resource contained in a new bill content is not yet on the commerce document server, the commerce document requests the resources after it acknowledges receipt of content. This frees the bill service provider from keeping track of who is up to date and who is not. In this way, version control of templates is automatic.

To achieve the stated and other features, advantages and objects of the present invention, an embodiment of the invention provides a method and system for presenting at least one bill for a consumer from a biller on a network. The method and system of an embodiment of the invention prepares a bill file for at least one bill for the consumer from the biller which includes bill data. The bill is automatically formatted using the data from the bill file, and the formatted bill is automatically stored for the consumer in a storage location. The consumer can then access the storage location to retrieve the bill. The consumer may be a business entity or an individual. The bill file is set out on, for example, the biller's server. The storage location is an electronic mailbox such as consumer mailbox hosted on a server such as a document server, and the formatted bill consists of an electronic mail message. The formatted bill is transmitted from the storage location to a terminal such as the consumer's personal computer, where it can be displayed by the consumer.

In an embodiment of the invention, the consumer transmits a request for the bill. The consumer may transmit the request to the biller, or the request may be transmitted to the biller for the consumer. The consumer may transmit the request to a consumer account of a consumer service provider. The consumer service provider transmits the request to a biller account of a bill service provider, and the bill service provider transmits the request to the biller. The storage location or consumer mailbox is linked or coupled to the consumer account, and the consumer accesses the storage location by initiating communication with the consumer account, for example, by accessing a terminal such as a personal computer. The biller account is hosted on the bill service provider's server. The biller transmits the bill file to the biller account, and the bill is automatically formatted by an application residing on the bill service provider's server.

The consumer's request for the bill also involves transmitting a request for bill presentment service for the consumer to the consumer service provider. The consumer service provider creates the consumer account in response to the request and transmits biller information, such as a list of billers which offer electronic billing, to the consumer. The consumer selects the biller from the list and transmits a request for bill delivery from the selected biller to the consumer service provider. If the consumer later decides to change consumer service providers, the consumer can transmit a request to the consumer service provider for transfer to a new consumer service provider. Preparing the bill file involves the biller transmitting a request for billing service for the biller to the bill service provider. The bill service provider creates the biller account for billing service for the biller in response to the request. Thereafter, the biller can be added to the list of billers which offer electronic billing, and information about the biller account can be transmitted to the consumer. The bill file from which the bill is automatically formatted includes a bill template and bill content. The bill file may also include a temporary resource. The bill file may be automatically formatted by the biller or by the bill service provider.

When the consumer accesses the storage location, the consumer may pay the stored bill. The consumer may pay the bill to the biller, or the consumer may pay the bill through a bill payment processor coupled, for example, to the consumer service provider's server. When the bill is paid, an acknowledgment of receipt by the biller may be transmitted to the consumer. Before transmitting the bill file by the biller, a test bill may be transmitted for the biller. After accessing the storage location by the consumer, a dispute of the bill may be transmitted to the biller. A status inquiry about the bill may also be transmitted to the consumer for the biller. If the biller discovers an error in the bill, a correction of the bill may be transmitted to the consumer. If the bill was sent in error, a reversal of the bill may be transmitted to the consumer. If the consumer decides to discontinue electronic billing from the biller, a notice to stop billing may be transmitted to the biller. If there is a problem in storing the formatted bill in the storage location, a notice of storage location error may be transmitted to the consumer.

Additional objects, advantages and novel features of the invention will be set forth in part in the description which follows, and in part will become more apparent to those skilled in the art upon examination of the following or may be learned by practice of the invention.

BRIEF DESCRIPTION OF THE DRAWINGS

In the figures:

FIG. 30 shows schematically a bill template for the bill for an embodiment of the present invention;

FIG. 31 shows schematically an enclosure template for enclosures with the bill for and embodiment of the present invention; and FIG. 32 is a table illustrating the layering of standards utilized in the process of bill presentment and payment for an embodiment of the present invention.

DETAILED DESCRIPTION

Figure 1:
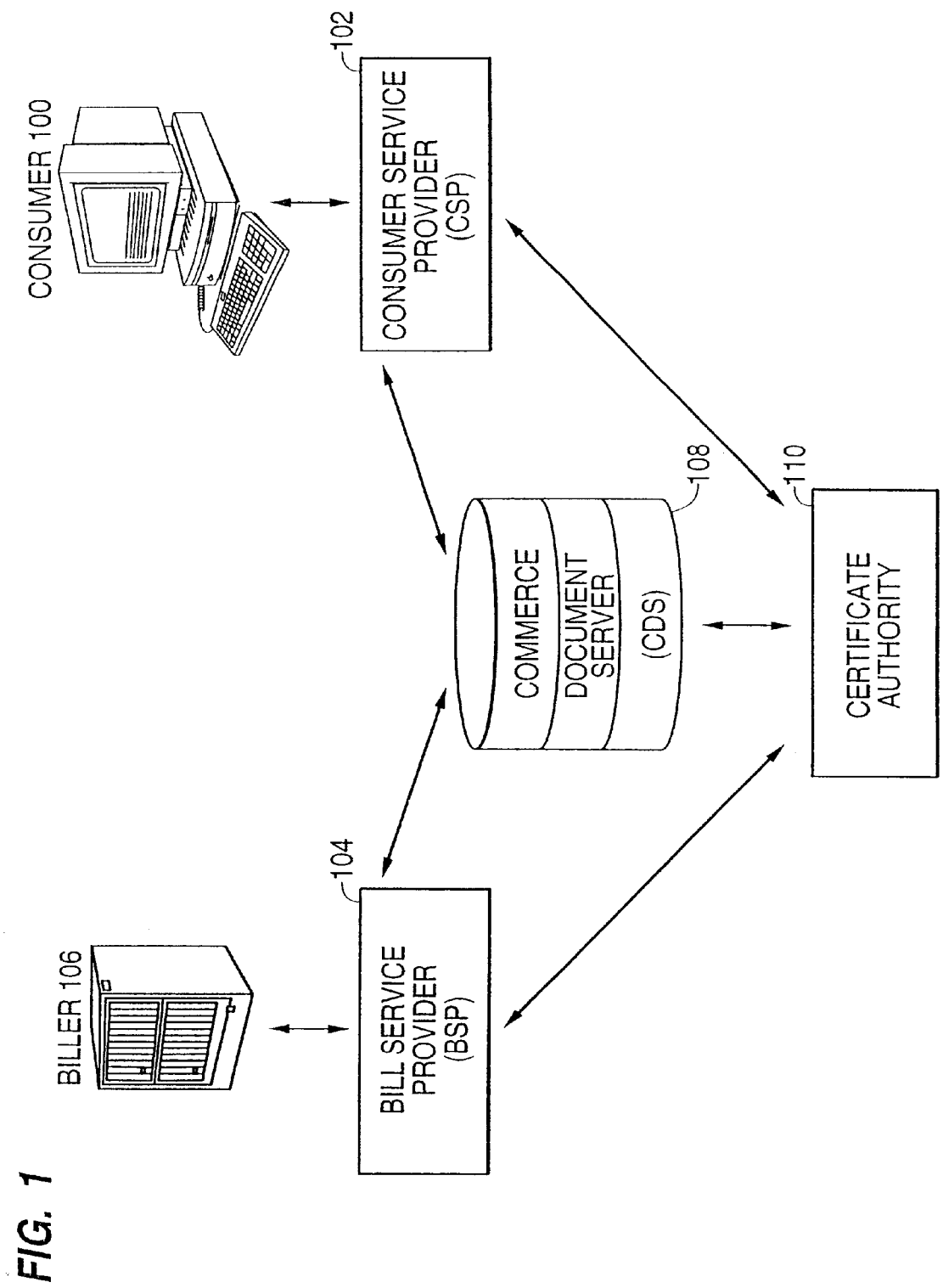
FIG. 1 shows an overview of the key components for an application of the bill presentment system for an embodiment of the present invention and the flow of information between the components.

The present invention relates to a system for computerized bill presentment, including the electronic delivery of a bill from a biller to a consumer and for electronic delivery of subsequent payment from the consumer to the biller. In an embodiment of the present invention, the bill presentment and payment process may involve a number of entities. The consumer is the individual or organization which receives and pays the bill. The consumer service provider is the entity which presents the bill to the consumer. The bill service provider is the entity which accepts and consolidates billing data from the biller, publishes the data and routes the data electronically to the appropriate consumer service provider. The commerce document server is the system or service that stores information such as routing, registration, and security about bill service providers, consumer service providers, bill payment processors and consumer payment processors. The bill payment processor is the entity that accepts payment on behalf of a biller and deposits the payment in the biller's account. The consumer payment processor is the entity that makes payment on behalf of the consumer from the consumer's account. The certificate authority is an entity which issues and revokes certificates to identify and verify service providers and their directories, provides rules, and provides procedures, addresses, and audits for compliance.

In an embodiment of the present invention, a single consumer service provider can provide bill presentment services for many billers and for many consumers. The biller may act as its own bill service provider and may interact directly with a consumer as both a bill service provider and a consumer service provider. The commerce document server may be distributed and independently managed by cooperating bill and consumer service providers. For example, each bill service provider and each consumer service provider may maintain its own system on behalf of its customers. The bill payment processor may be the financial institution where the biller maintains an account; and the consumer payment processor may be the financial institution where the consumer maintains an account. A single financial institution such as a bank may act both as a consumer service provider and a consumer payment processor for individuals or entities.

An embodiment of the present invention may also involve a number of system components. The consumer's personal computer is generally used by the consumer to receive and pay bills, although other devices may be used for receiving and paying bills, such as a telephone, an ATM/CAT, a television set-top box, or the U.S. mail. The consumer's bills are stored and forwarded to the consumer's electronic mailbox and/or through the consumer's home banking software, and the mailbox and home banking server software are generally hosted on the consumer service provider's smart server. The consumer can elect to see all his/her bill summaries on a single display page, or see each bill individually. The bill may contain summary data only with links to the bill details, or the bill details with possibly accompanying graphics may be shown. Bill data is set out and bill payment information is provided on the biller's mailbox and server. If the biller operates out of a legacy system and does not actually have an electronic mailbox, the bill service provider operates the biller's mailbox to set out bill data, and provide bill payment information back to the biller via a dedicated custom interface to the biller's legacy system. Various types of service providers who work on behalf of the consumer and the biller also have mailboxes and servers.

In an embodiment of the present invention, the data is put in generic, open standard bill format for interface between the biller's mailbox and the consumer's mailbox. Either the biller or the bill service provider may then use the biller's mailbox, hosted on the biller's smart server, to present bills and collect payments. The consumer and biller may act as their own service providers. Other types of service providers who can act on behalf of a consumer include, for example, the bank or financial institution where the consumer has an account, the bank or financial institution with which the consumer has a payment product such as a credit card account, or a bill payment processor. Such bank, financial institution, or service may act as the consumer's primary service provider on behalf of operating the smart server that hosts the consumer's mailbox where all the consumer's bills are received, stored and can be acted upon such as, for example, paid. Examples of service providers who work on behalf of a biller include the biller's cash management and electronic lock box manager and the biller's bill consolidator.

In general, an embodiment of the present invention involves a number of entity roles. The consumer signs up with the consumer service provider to get electronic bill presentment and payment services. The consumer has a mailbox account with the consumer service provider that resides on a commerce document server. The consumer receives and stores bills in the mailbox and sends payment instructions to the consumer service provider. The consumer requests statement information from the consumer service provider and sends customer services requests to bill via the consumer service provider. The consumer has the primary role of statement recipient, although in a business-to-business relationship, the consumer may have both roles.

In an embodiment of the present invention the consumer service provider responds to consumer requests for bill information and forwards some customer service requests and responses. The consumer service provider provides one or more payment mechanisms to consumers and provides value added services to consumers. The consumer service provider also updates viewing and payment instruction bill status and may render template and content into displayable statement. The consumer service provider may mirror some commerce document server storage and may also be an internet service provider. The consumer service provider may contract with multiple commerce document servers, but only one is typical, and the consumer service provider typically services many consumers. A consumer typically has only one consumer service provider which provides mailbox access to bills, with a consumer account assigned one mailbox and therefore residing on one consumer document server. Further, many bill service providers can send to a given consumer mailbox.

In an embodiment of the present invention, the commerce document server stores templates, content, and logs and provides access to same. The commerce document server provides audit and statistical services. The commerce document server may render or merge a template and its associated content into a displayable statement. The commerce document server charges the bill service provider and the consumer service provider for storage, access, traffic, and rendering. The commerce document server also updates bill status. The commerce document server may receive bills from multiple bill service providers and may deliver bills to multiple consumer service providers.

In an embodiment of the present invention, the bill service provider reformats bill design and content into standard format, submits templates and associated content to the commerce document server for storage, and provides value added services to billers. The bill service provider bills the biller for services. The bill service provider also logs transaction activity and status. The bill service provider is billed by the consumer document server for storage, access, and traffic. The bill service provider updates bill status and may hosts enclosure content. The bill service provider may be the first level response for consumer service requests. The bill service provider typically contracts with multiple billers.

In an embodiment of the present invention, the biller provides bill design and bill content to the bill service provider and is charged by the bill service provider for services. The bill service provider updates bill status. The bill service provider contracts with a single bill service provider and is considered to be in the primary role as statement organizer. The bill service provider communicates with the consumer via commerce documents, which include statements, bills, enclosures, customer service requests, responses, and the like, and which are built on demand from two components, namely a template, that describes the look and feel of the document, and content, which contains the data. The biller may have more than one type of template, and each template may have multiple versions. Templates are originated and stored by the biller.

In an embodiment of the present invention, the certificate authority interacts off-line with the bill service provider, consumer document server, and consumer service provider and is not in the transaction flow. The certificate authority assigns certificates to identify and verify members, authenticates member signatures, provides rules and procedures, provides member directory and mailbox addresses, arbitrates disputes between members, and audits for compliance. The power of the certificate authority is vested in its ability to revoke certificates. Enrollment to the certificate authority is done off-line and gives an originator the certificate keys to identify itself to each site as a bona fide originator with access rights. The certificate is also used to authenticate signed acknowledgments when an entity receives something from another originator on the system.

In an embodiment of the present invention, the bill which is electronically delivered from the biller to the consumer consists of three main components, namely, content, enclosures and format, and is designed to minimize the transmission of redundant data. The bill is designed to minimize the transmission of redundant data by separation of the essential contents, for example, into text and format, which is typically graphical. The components of the bill must conform to the bill presentment format or the bill definition language. The bill template describes the look and feel of the bill but does not contain the data that changes each billing period. The template is expressed in computer language with an insert tag having a tag name that is either a standard or originator (biller)-defined data name placed within the computer language. When the content is merged with the template, content data names are matched to template data names, and when an insert tag is found in a template, it is replaced with the value of a data name in the content with the same name. The template may also contain things like logos, customer service numbers, and the like that do not change frequently. The bill template is merged with its corresponding content to create a displayable statement called a rendering. The bill template is matched to content by the originator, template name, and template version. The bill templates "drive" the merge process since they may contain displayable information not in the content. When a bill template is defined, the variable data is represented by named tags called insert tags that do not occur in pairs but are simply place holders with a name that indicates where the data is to be placed. However, the corresponding content tags do occur in pairs with a begin tag and an end tag and with the value stored between them. Tags can refer to items that are stored on remote servers such as back at the biller service provider or biller's web sites. For example, the bill summary data and bill summary format and bill detail format can be transmitted to the consumer service provider for delivery to the consumer, with the bill details and enclosures and advertisements indicated by tags that link back to the biller and/or biller service provider's web pages.

In an embodiment of the present invention, the bill content includes the billing cycle data for a given template. The bill content contains no formatting information but is a stream of data name tags that are matched to insert tags in the template. To make extending the recognized data names an easy process, the system that scans templates assumes that unrecognized tags that are in proper format are originator-defined data names. During a merge, it is assumed that the template names match the content names. The bill content is variable data of a bill that changes with each billing cycle represented in a data stream as a collection of named values via computer language tag pairs. Bill content is registered to a given recipient with an initial status of "new." When the consumer wishes to see the consumer's bill statements, a query can be done by status. Selected new bills return a collection of only those bills for the consumer that have a status of "new." Selected "not paid in full" bills return those bills that are either new, held, or partially paid. The mechanics are not substantially different than that of templates other than that content is registered to recipients, and supplies information to a merge, rather than driving the merge.

In an embodiment of the present invention, an enclosure may also be delivered electronically from a biller to a consumer. The enclosure is the electronic equivalent of paper inserts found in bills to communicate information to recipients, as well as marketing channels. In order to avoid the possibility of excessive download times, design user interfaces are designed such that the user is aware that the information is available, but is not intrusive, and in order to make transmission of enclosures more efficient, enclosures are not sent with bills, but actually sent separately, with only one instance of a given enclosure being sent. References are then made in the bill that make the connection to the enclosure possible, without actually sending the enclosure with every bill. The enclosure can be hosted as a service on the same machine as the commerce document server or be hyperlinks to other servers. Hyperlinks may be preferable to larger originators, who may wish to host their own web sites, whereas a hosting service may be preferable to smaller or less technical originators. The mechanics are basically the same for both, for example, a uniform resource locator (URL) is used as a reference to an enclosure in a given template. The URL locator may then either reference an enclosure on the local machine or a different machine, and the need for organizing and tracking resource files (graphics, related computer language pages, sounds, etc.) only becomes necessary when the resource files are also located on the commerce document server.

In general, operation of an embodiment of the present invention is a follows: The consumer must perform a one time bill presentment registration to a consumer service provider before any bill can be delivered electronically to the consumer. The consumer enrolls with a consumer service provider and understands the options offered by the consumer service provider, such as the world wide web, e-mail, home/PC banking, interactive TV, telephone, paper bills, and the like. The consumer service provider may offer additional services such as bill arrival notification. The consumer may find one or more billers participating in the process, either by inquiring directly with the billers or through the consumer's service provider, in which case, the consumer service provider determines which bill service provider provides service for particular billers through a directory service. The consumer signs up with the consumer service provider and activates bill presentment service for one or more accounts with one or more billers.

The bill service provider and consumer service provider exchange their respective names and/or ID's, addresses and their respective certified public keys. The biller and consumer can notify each other that they are equipped for electronic bill presentment and payment and provide their respective service providers' names and addresses, or alternatively they can find each other by querying their respective service providers. Each bill service provider and consumer service provider can query each other for the names and/or ID's of their respective billers and consumers. Each bill service provider maintains a directory of all its billers, their addresses, certificates and public keys, and all the applicable consumer service providers, their addresses, certificates and public keys. Similarly, each consumer service provider maintains a directory of all their respective consumers, their addresses, certificates and public keys, and all the applicable bill service providers, their respective addresses, certificates, and public keys. Participating billers may provide their respective consumers with their names and/or ID's, and their respective bill service providers' names and/or ID/'s and addresses, either directly or through their respective bill service providers. Participating consumers can provide their respective billers with their names and/or ID's and their respective consumer service providers' names and/or ID's and addresses, either directly or through their respective consumer service providers. Participating consumers may obtain their respective billers' addresses either directly or through their respective consumer service providers.

The biller may have specified requirements, including such things as the biller will only accept electronic payment for electronically presented bills, the biller will permit delivery of electronic bills only over certain classes of devices (e.g., excluding telephone), or the biller requires acknowledgments such as acknowledgment that the bill has been received. The consumer service provider informs the applicable bill service provider for future routing of the consumer's bills, and the biller or the biller's service providers may choose to serve an electronic or paper notification directly to the consumer as confirmation of registration. The consumer expects bills to be presented with the next billing cycle of each biller.

The biller prepares a bill file, including all data in that day's bills to be generated, with the consumer's name and addresses, an optional remittance information as a separate data item, an optional bill template that describes the look and feel of the bill, and other optional enclosures. Optional enclosures may include regulatory documents, inserts and advertisements. The bill service provider obtains the bill file from the biller and formats or converts the bill along with enclosures to a standard bill definition language and publishes the bill for each consumer and routes copies of the bills, individually or in batch, to the applicable consumer service provider by means of a secure transport utility. The bill definition language is an extension of hypertext markup language/extended markup language that allows for combining templates with data, and taking digital signatures. The bill service provider includes the mailing address for the consumer and billing dates. The bill is placed directly in the biller's mailbox for electronic mailing to the appropriate consumer service provider's mailbox. The consumer service provider can be notified that the bill is available, and the bill can be stored until requested by the consumer service provider, or alternatively the bill service provider can send the bill to the consumer service provider as soon as it is available. For each bill received, the consumer service provider may send an acknowledgment of receipt to the entity or entities maintaining the bill cycle status for that bill. The entities may be the consumer service provider and/or the bill service provider. The consumer service provider presents the bill to the consumer, typically along with other bills for the consumer. The consumer can be notified that the bill is available, the bill can be stored until requested by the consumer, or the consumer service provider can send the bill to the consumer as soon as it is available. When the consumer accesses the presented bill, an acknowledgment message may be sent to the bill service provider.

The consumer may either pay the bill by giving payment instructions to the consumer service provider, which has a system linked for processing payment or by sending an electronic mail with a payment instruction to the consumer's or the biller's bill payment processor. The consumer has the choice of paying by any payment alternative accepted by the biller, such as check or credit card. The consumer's or the biller's payment processor then clears and settles the payment. The consumer's payment processor may send a message to the bill service provider and the consumer service provider that a payment has been initiated for that bill, along with remittance information. When the biller's payment processor receives payment and credits the biller's account, the biller's payment processor may acknowledge receipt of funds to the bill service provider and the consumer service provider. Once the cycle has been completed, a notification of cycle completion may be sent to the appropriate party or parties.

Figure 2:
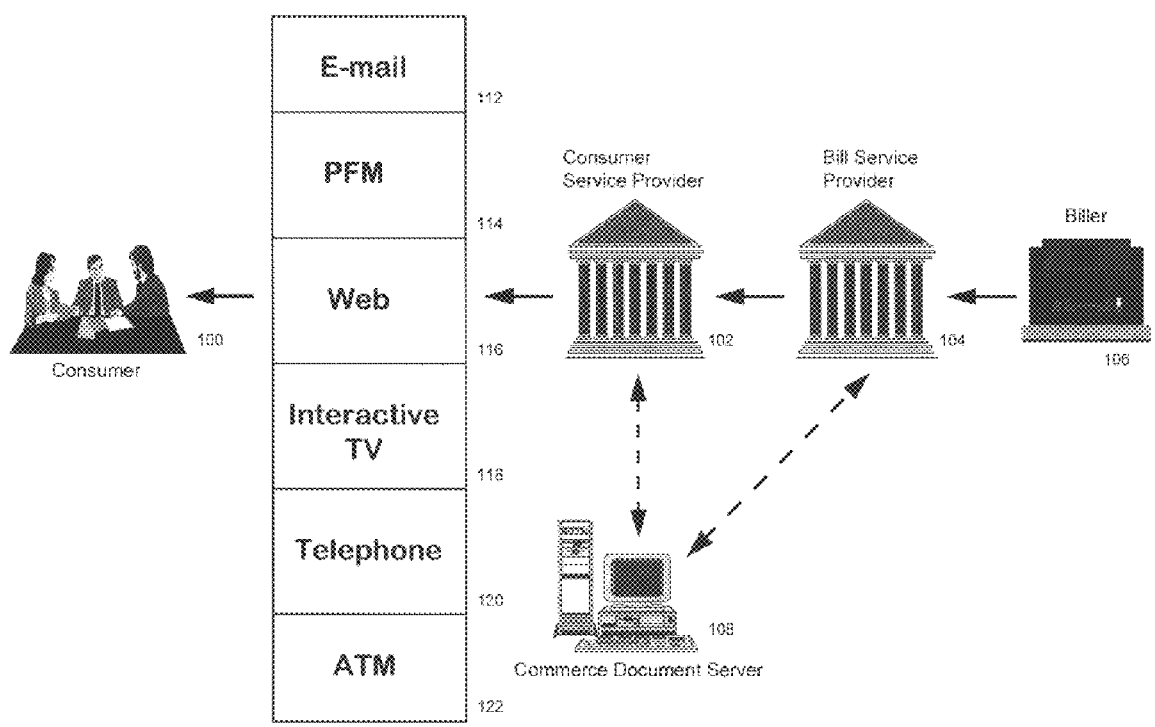
FIG. 2 is a flow chart which amplifies the flow of information shown in FIG. 1 and provides further detail regarding the flow of information to the consumer through optional channels in the system of FIG. 1.

Referring now in detail to an embodiment of the invention, an example of which is illustrated in the accompanying drawings, FIG. 1 shows an overview of the key components for an application of an embodiment of the present invention. Referring to FIG. 1, the consumer at, for example, a terminal 100, such as a personal computer, is the individual or organization which receives and pays bills. The consumer service provider 102 is the entity that presents the bills to the consumer 100. The bill service provider 104 is the entity which accepts and consolidates bills for the biller 106, publishes the data and routes the data electronically to the consumer service provider 102. The commerce document server 108 is the system or service that stores information such as routing, registration, and security about the bill service provider 104, the consumer service provider 102, bill payment processors and consumer payment processors. The certificate authority 110 is an entity which issues and revokes certificates to identify and verify service providers and their directories, provides rules, and procedures, addresses, and audits for compliance. Generally, a personal computer is used by the consumer 100 to receive and pay bills, although other devices may be used as illustrated in FIG. 2. Bills for the consumer 100 are stored and forwarded to the consumer's electronic mailbox hosted on the commerce document server 108, which may be the consumer service provider's smart server. Bill data is set out and bill payment information is provided on the biller's electronic mailbox and server. If the biller 106 operates out of a legacy system and does not actually have an electronic mailbox, the bill service provider 104 may operate the biller's mailbox to set out bill data and provide bill payment information back to the biller 106 by means of a dedicated custom interface to the biller's legacy system.

Figure 3:
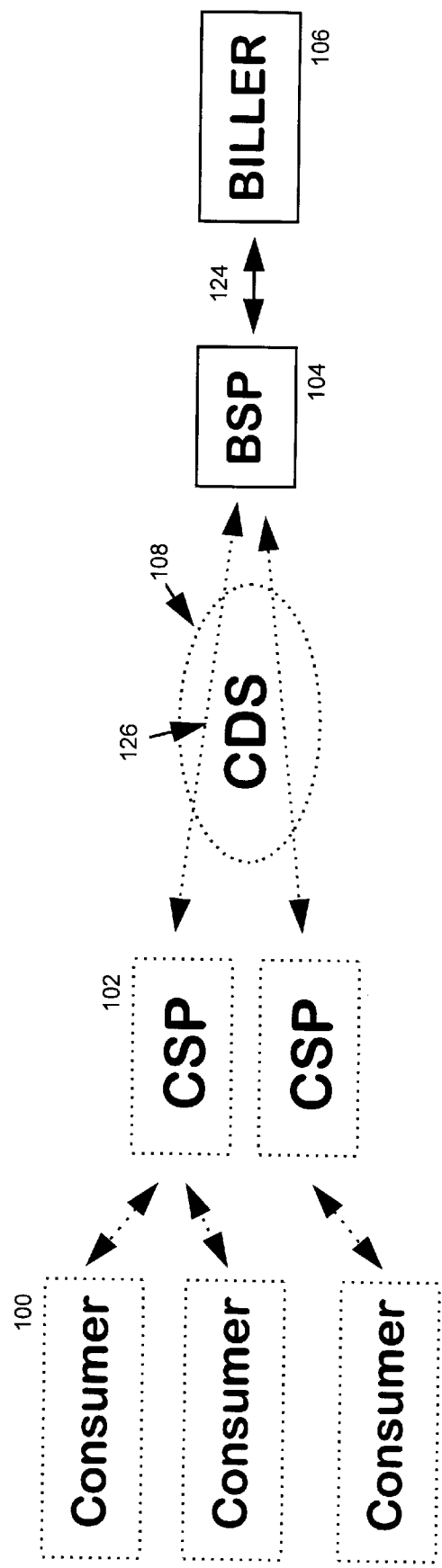
FIG. 3 is a flow chart which amplifies the flow of information in FIG. 1 and provides further detail regarding the flow of information between the biller and multiple consumers for an embodiment of the present invention.
Figure 4:
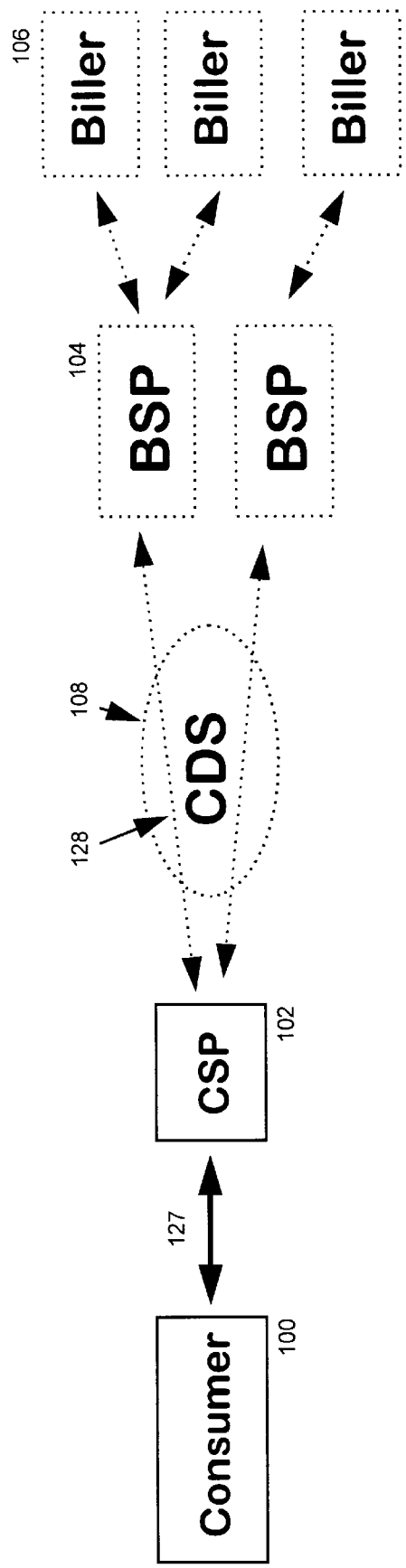
FIG. 4 is a flow chart which amplifies the flow of information in FIG. 1 and provides further detail regarding the flow of information between the consumer and multiple billers for an embodiment of the present invention.

FIG. 2 amplifies the flow of information demonstrated in FIG. 1 and provides further detail regarding flow of information to the consumer 100 through optional channels offered by the consumer service provider 102, such as electronic mail 112, personal financial module (PFM) 114, the world wide web 116, interactive TV 118, telephone 120, or ATM/CAT 122. Referring to FIG. 3, the biller 106 signs up for billing service with the bill service provider 104 and negotiates with the bill service provider 104 for service and terms for bill presentment and payment at 124. The bill service provider 104 publishes the biller information in its directory 108 at 126 and may specify particulars such as only electronic payment. As illustrated in FIG. 3, the bill service provider 104 may deal with multiple consumer service providers, and the consumer service provider 102 may deal with multiple consumers. Referring to FIG. 4, the consumer 100 signs up for bill presentment service by enrolling with the consumer service provider 102 at 127. The consumer service provider 102 publishes the consumer's mailbox address in its directory 108 at 128. The consumer 100 selects the biller 106 for electronic billing. The consumer service provider 102 activates bill presentment for the consumer 100 from the biller 106 at 128. As illustrated in FIG. 4, the consumer service provider 102 may deal with multiple bill service providers, and the bill service provider 104 may deal with multiple billers.

Figure 5:
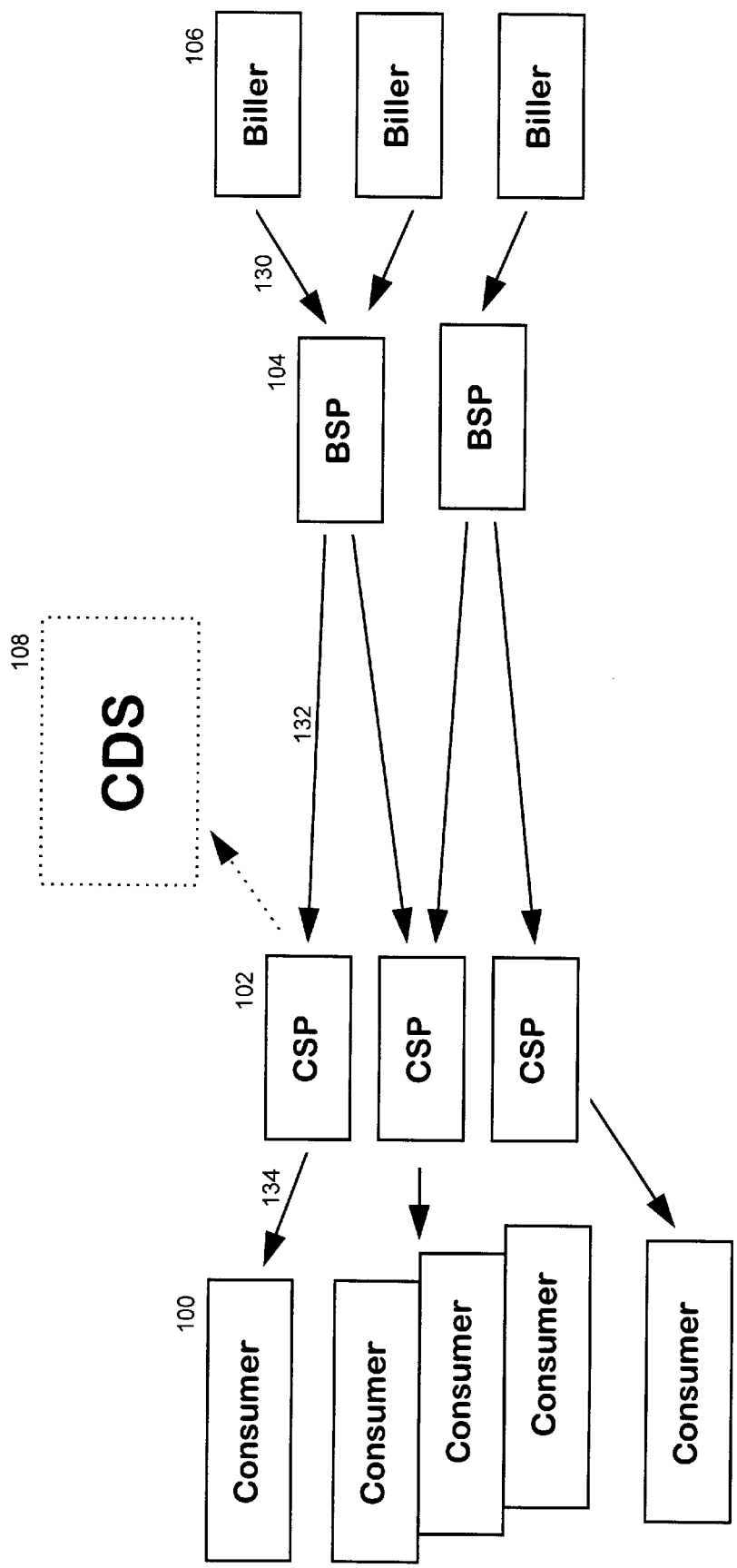
FIG. 5 is a flow chart which amplifies the flow of information in FIG. 1 and provides further detail regarding the flow of information between multiple billers and multiple consumers for an embodiment of the present invention.
Figure 6:
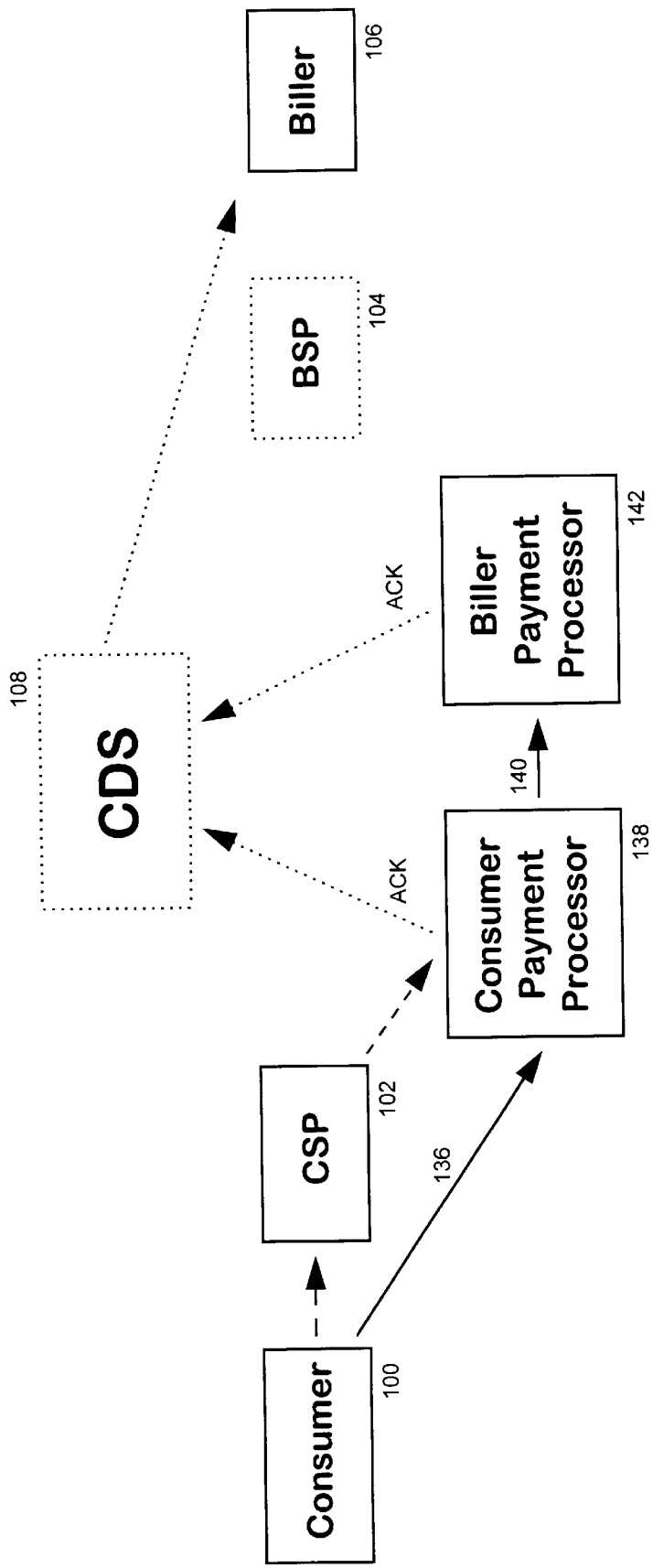
FIG. 6 is a flow chart which amplifies the flow of information in FIG. 1 and provides further detail illustrating the flow of information in the process of payment of the bill by the consumer for an embodiment of the present invention.

Referring to FIG. 5, the biller 106 prepares and sends the bill file to the bill service provider 104 at 130. The bill service provider 104 formats the bill into standard bill presentment form and routes it to the consumer service provider 102 at 132 and may provide optional status reporting. The consumer service provider 102 presents the bill to the consumer 100 over the consumer service provider's home banking software at 134 and may also provide optional status reporting. As illustrated in FIG. 5, multiple bill service providers may deals with multiple billers and multiple consumer service providers. Multiple consumer service providers may deal with multiple consumers and multiple bill service providers. FIG. 6 illustrates the flow of information in the process of bill payment by the consumer 100. The consumer 100 initiates payment through the consumer service provider's home banking software at 136. The consumer service provider 102 processes payment through its consumer payment processor 138 at 140. The consumer payment processor 138 clears and settles payment and may provide optional status reporting. The biller payment processor 142 receives and deposits payment into the biller's account and may also provide optional status reporting.

Figure 7:
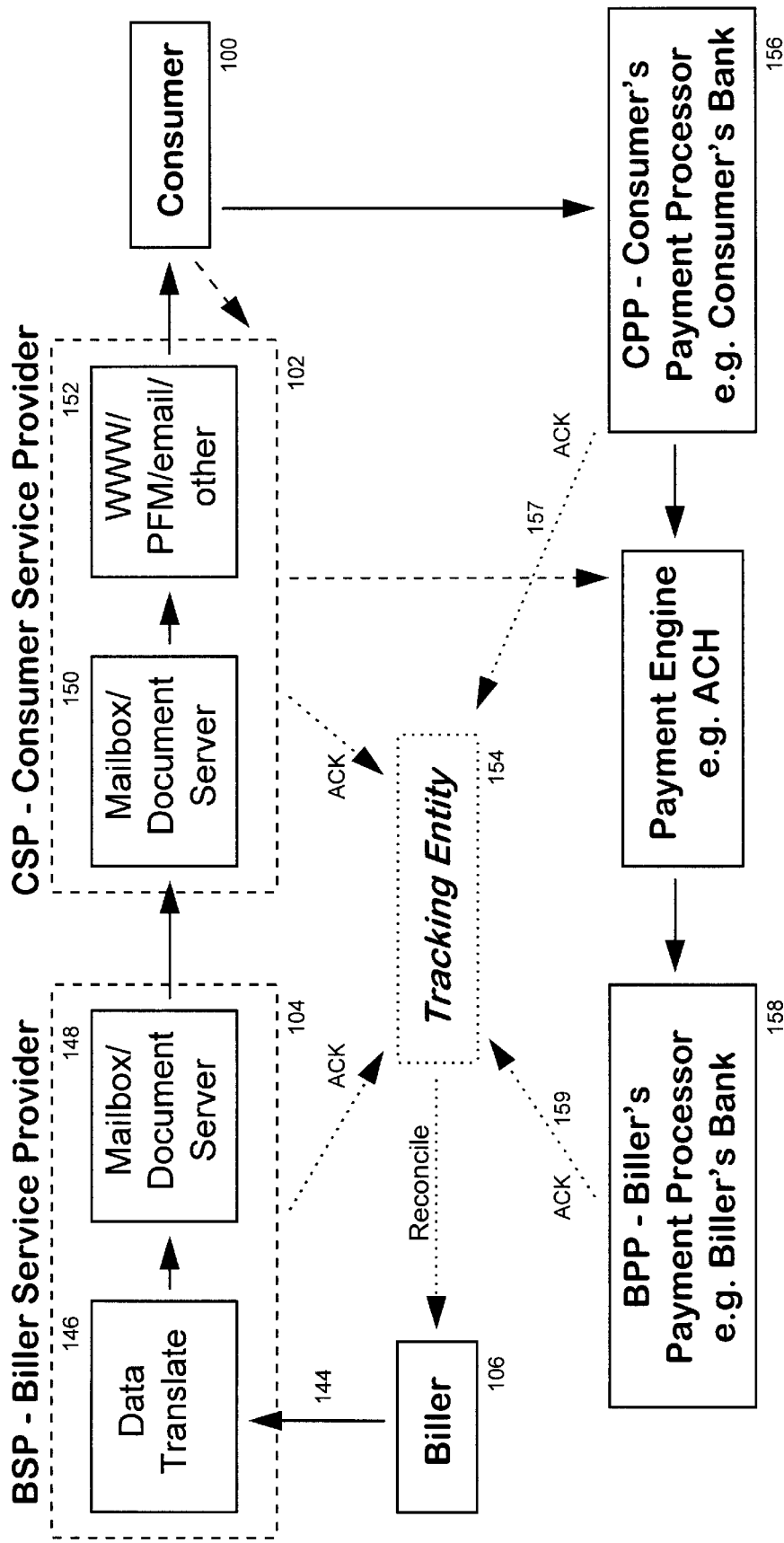
FIG. 7 is a flow chart which amplifies the over all system in FIG. 1 and demonstrates an example of the flow of information illustrated in FIGS. 1–6.

FIG. 7 illustrates an example of the flow of information demonstrated in FIGS. 1–6. Referring to FIG. 7, the biller 106 prepares a bill file, which includes all the data in a particular day's bills to be generated. The bill service provider 104 captures the flat or formatted bill file from the biller 106, or the biller 106 sends the file to the bill service provider 104 at 144. The bill service provider 104 converts the bill, along with enclosures, such as regulatory documents, inserts, and advertisements, to a standard bill definition language at 146. The standard bill definition language is an extension of hypertext markup language/extended markup language that allows for combining templates with data and taking digital signatures. The bill service provider 104 also includes the mailing address for the consumer 100 and billing dates. The biller 106 may act as its own bill service provider. The bill service provider 104 places the bill directly in the biller's mailbox for electronic mailing at 148, utilizing secure multipurpose internet mail protocol, to the appropriate consumer service provider's mailbox 150. The information is secured during transit by using the public key of the consumer service provider 102. Any electronic mail service 152 that can handle secure multipurpose internet mail protocol, hypertext markup language and attachments can be used. The consumer service provider 102 receives, decrypts the bill and acknowledges receipt of the bill to the bill service provider 104. The bill can be sent or "pushed" when available or held and sent when requested, i.e., "pulled." The bill is typically stored and presented to the consumer 100, along with other bills for the consumer 100, by one or more of the consumer's electronic mailbox, personal financial module, the consumer's bank's home banking or bill payment system, or the consumer's personal web page. The stored information is encrypted to the consumer's public key. The consumer 100 authenticates himself or herself to the consumer service provider 102, and either receives the bill by retrieving and decrypting an electronic mail, i.e., opening the envelope, or the consumer 100 logs on and accesses the bill through the consumer's home banking/bill payment software. The consumer 100 can "pull" or request to see the bill, or the consumer 100 can request to be notified that a bill has arrived, i.e., "pushed." When the bill has been retrieved, an optional acknowledgment may be sent by the consumer service provider 102 to the tracking entity 154.

Also referring the FIG. 7, the consumer 100 either pays the bill by encrypting and sending a digitally signed electronic mail with a payment instruction to his or her payment processor 156, or the consumer 100 may pay the bill from his or her home banking/bill payment personal finance software, which interfaces to the payment processor 156 transparent to the consumer 100. If the consumer 100 pays by electronic mail, or interfaces directly to the payment processor 156 other than through his or her home banking/bill payment software, the payment instruction is encrypted and digitally signed. If the payment is made through the home banking/bill payment software, some equivalent form of authentication is required, e.g., a password or pin number protection over an encrypted secure socket layer link with the consumer service provider 102 to provide security. The payment instruction is linked to the bill remittance information and returned to the bill service provider 104 and the consumer service provider 102. The payment processor 156 decrypts and authenticates the payment instruction, and then clears and settles the payment using, e.g., an automatic clearing house authorization. The payment processor 156 acknowledges that it has submitted the payment for the processing back to the appropriate tracking entity 154 at 157. When the biller's bank payment processor 158 receives payment and credits the biller's account, the payment processor 158 acknowledges receipt of funds to the tracking entity 154 at 159. The payment processor 158 may be the bill service provider 104 or, e.g., an electronic lockbox/concentrator. Once the cycle has been completed, the tracking entity 154 sends a notification of cycle completion to the appropriate party. For example, remittance information may be carried through to the accounts receivable back-end of the biller 106 for reconciliation. If for any reason payment fails, notification is required.

Figure 8:
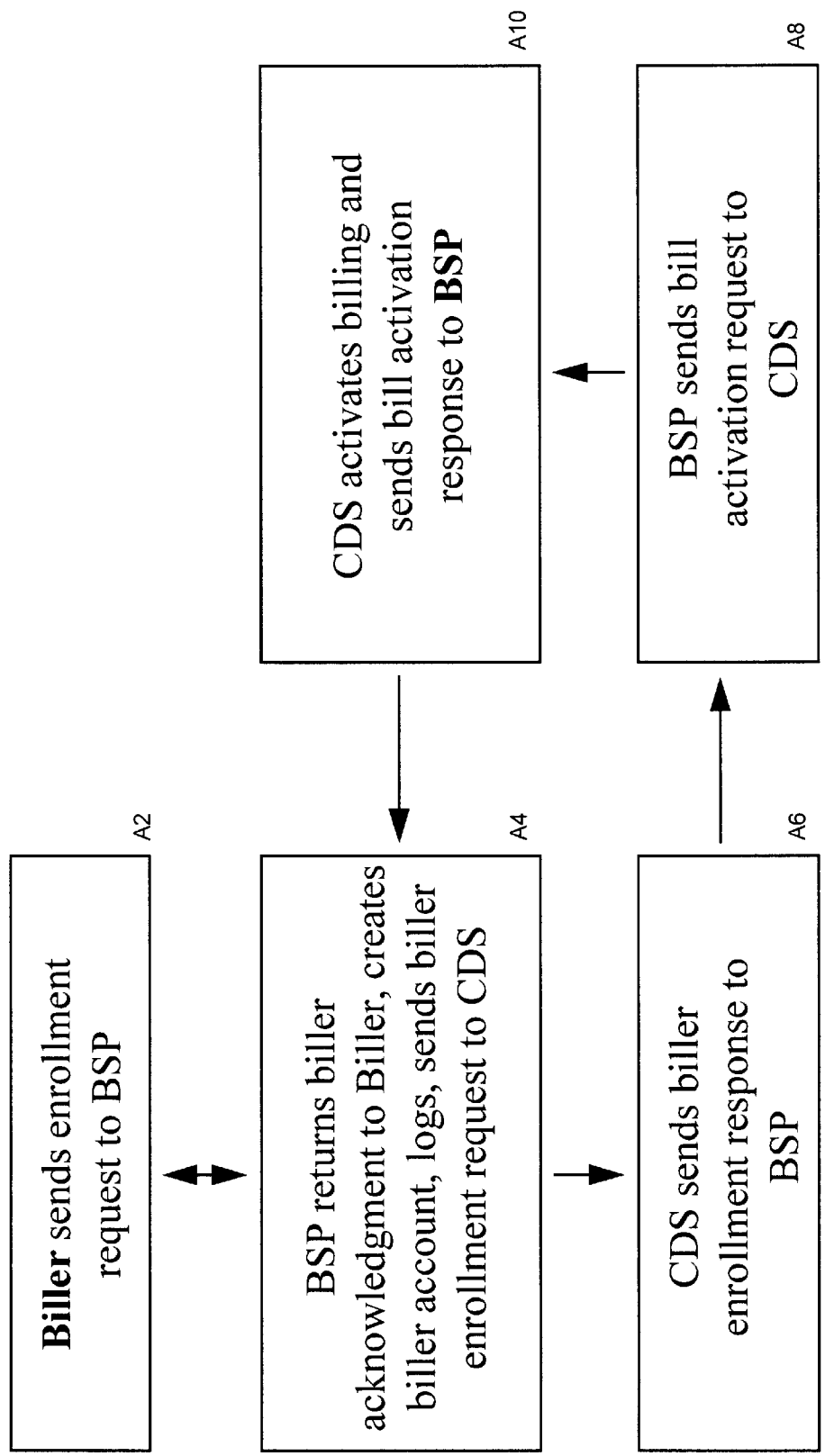
FIG. 8 is a flow chart which provides further detail regarding the process of the biller signing up for billing service for an embodiment of the present invention.

FIG. 8 is a flow chart which provides further detail regarding the flow of information in the process of a biller 106 signing up for billing service. The biller 106 must perform a one time bill presentment registration to the bill service provider 104 before the biller 106 can deliver bills electronically. In step A2, the biller 106 submits a biller registration to the bill service provider 104 by sending a request for billing service for the biller 106 to the bill service provider 104. The bill service provider 104 receives and logs the request and creates a bill presentment account and sends acknowledgment of the biller registration to the biller 106 at A4. The bill service provider 104 may also issue a certificate to the biller 106. The biller 106 may now notify its consumers that it offers bill presentment service and request that its consumers furnish the consumers' mailbox addresses for bill delivery. The bill service provider 104 informs the commerce document server 108 of new billers in one of two ways. The bill service provider 104 may simply wait for the commerce document server 108 to inquire about the biller 106 when the bill service provider 104 submits the first bill from that biller 106 to the commerce document server 108 as demonstrated in FIG. 13, or alternatively, as illustrated in FIG. 8, the bill service provider 104 may batch all new billers and send enrollment messages to the commerce document server 108. In the latter case, in step A4, as illustrated in FIG. 8, the bill service provider 104 also sends a request for biller enrollment for the biller 106 to the commerce document server 108. The commerce document server 108 receives the biller enrollment request and sends a biller enrollment response to the bill service provider 104 at A6. In step A8, the bill service provider 104 sends a request for billing service activation for the biller 100 to the commerce document server 108. The commerce document server 108 receives the request, activates billing service for the biller 106, and returns a billing service activation response to the bill service provider 104 at A10. The bill service provider 104 may also request the commerce document server 108 to create a biller mailbox.

Figure 9:
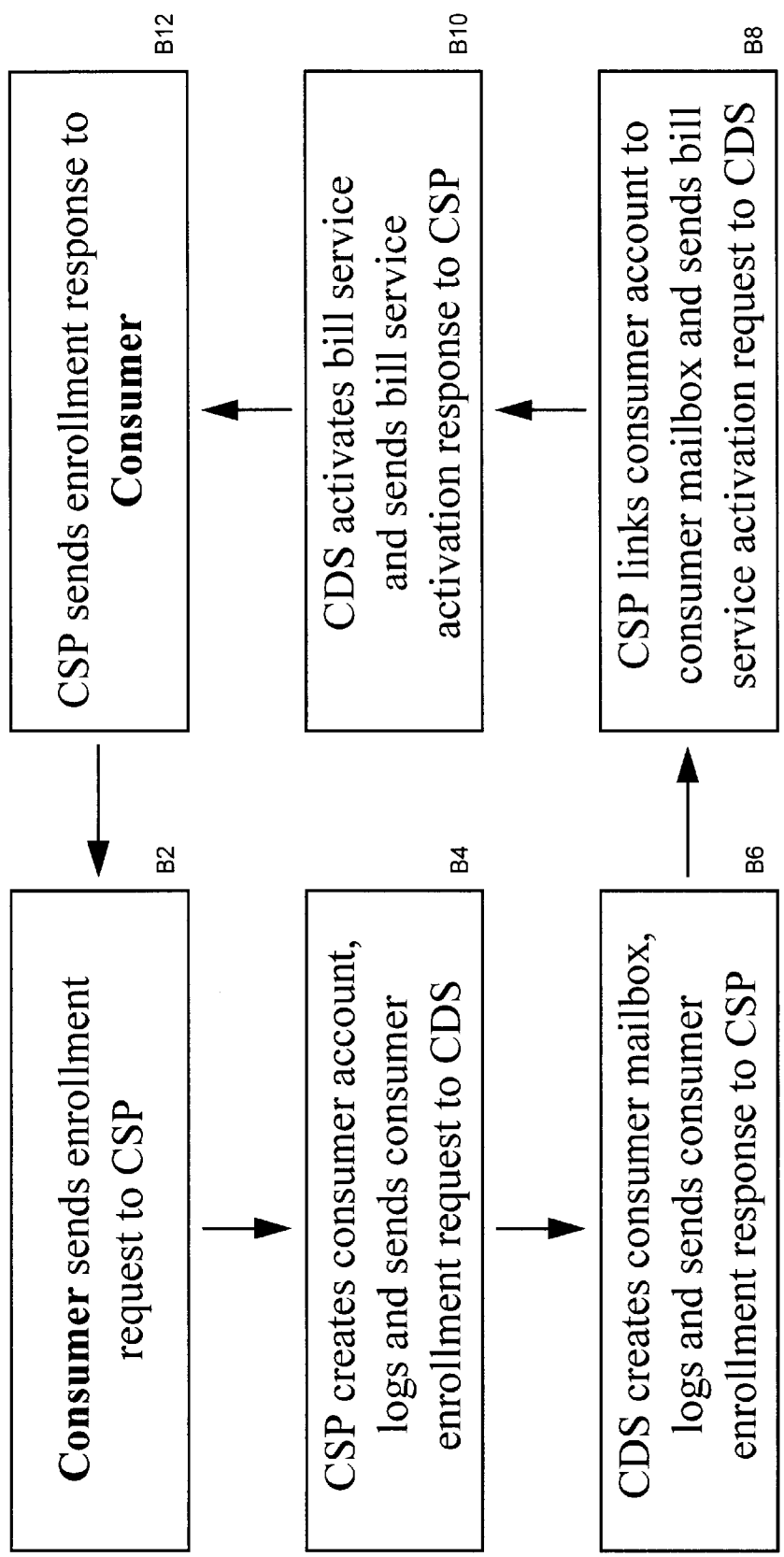
FIG. 9 is a flow chart which provides further detail regarding the process of the consumer signing up for bill presentment service for an embodiment of the present invention.

FIG. 9 is a flow chart which provides further detail regarding the process of the consumer 100 signing up for bill presentment service. The consumer 100 must likewise perform a one time bill presentment registration to a consumer service provider before any bill can be electronically delivered to the consumer 100. In step B2, the consumer 100 submits a consumer bill presentment registration by sending a request for bill presentment service for the consumer 100 to the consumer service provider 102. The consumer 100 may also specify notification by an e-mail address for the consumer 100. The consumer service provider 102 receives and logs the request, creates a consumer bill presentment account for the consumer 100, and transmits an enrollment request for bill presentment service for the consumer 100 to the commerce document server 108 at B4. The consumer service provider 102 may also issue a certificate to the consumer 100. The commerce document server 108 receives and logs the enrollment request, creates a consumer mailbox using a name specified by the consumer service provider 102, stores the notification e-mail address, and sends a consumer enrollment response to the consumer service provider 102 at B6. The consumer service provider 102 receives the enrollment response, links the consumer bill presentment account to the consumer mailbox on the commerce document server 108, and sends a bill presentment service activation request to the commerce document server 108 at B8. In step B10, the commerce document server 108 receives and logs the activation request, activates bill presentment service for the consumer 100, and sends a bill presentment service activation response to the consumer service provider 102. In step B12, the consumer service provider 102 receives the activation response and sends an acknowledgment to the consumer 100 of the bill presentment registration. The consumer 100 is now ready to add billers to its bill presenter list and to request delivery of bills from billers to its consumer mailbox on the commerce document server 108.

Figure 10:
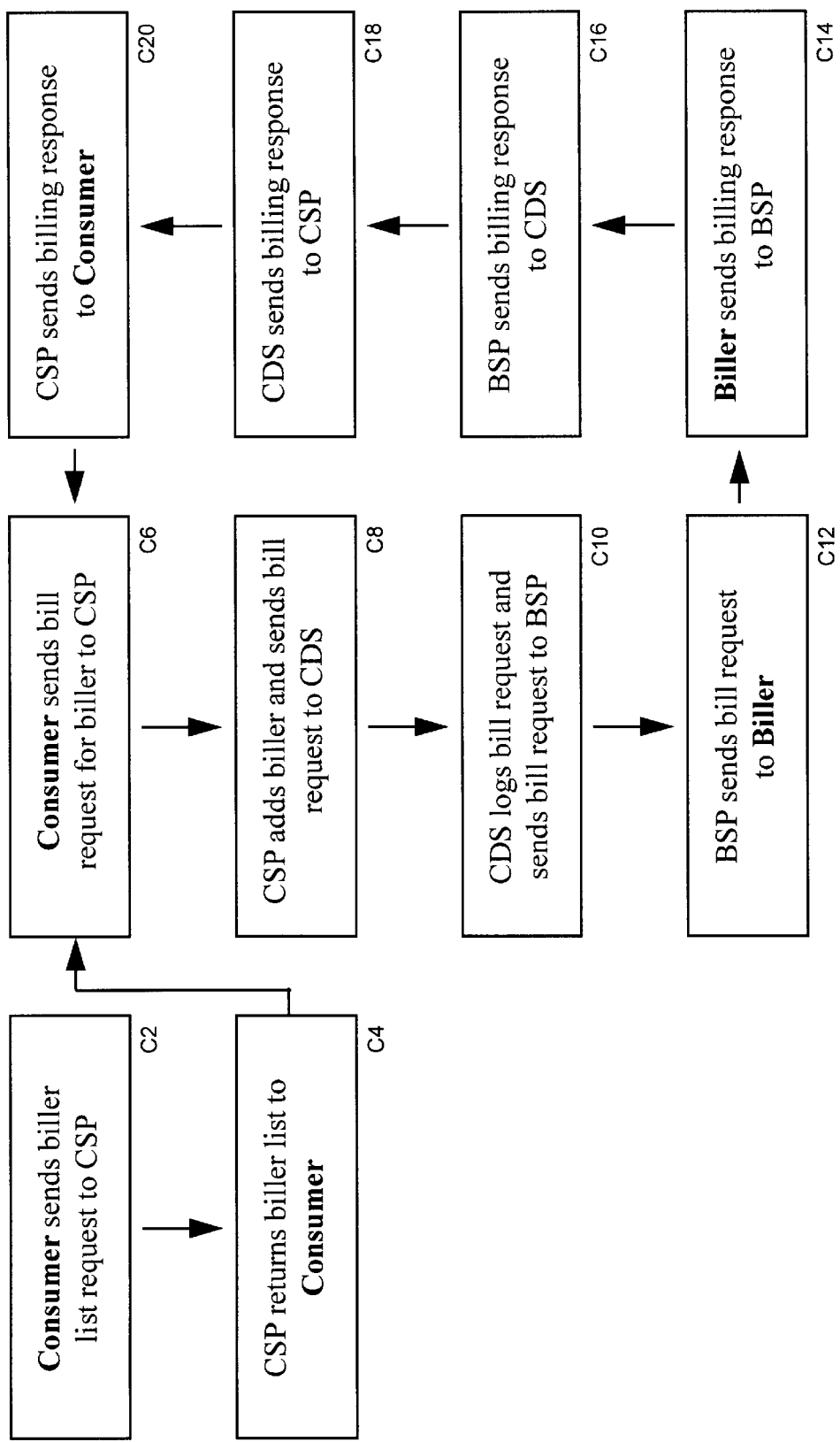
FIG. 10 is a flow chart which provides further detail regarding the process of the consumer requesting electronic bills via the consumer service provider for an embodiment of the present invention.
Figure 11:
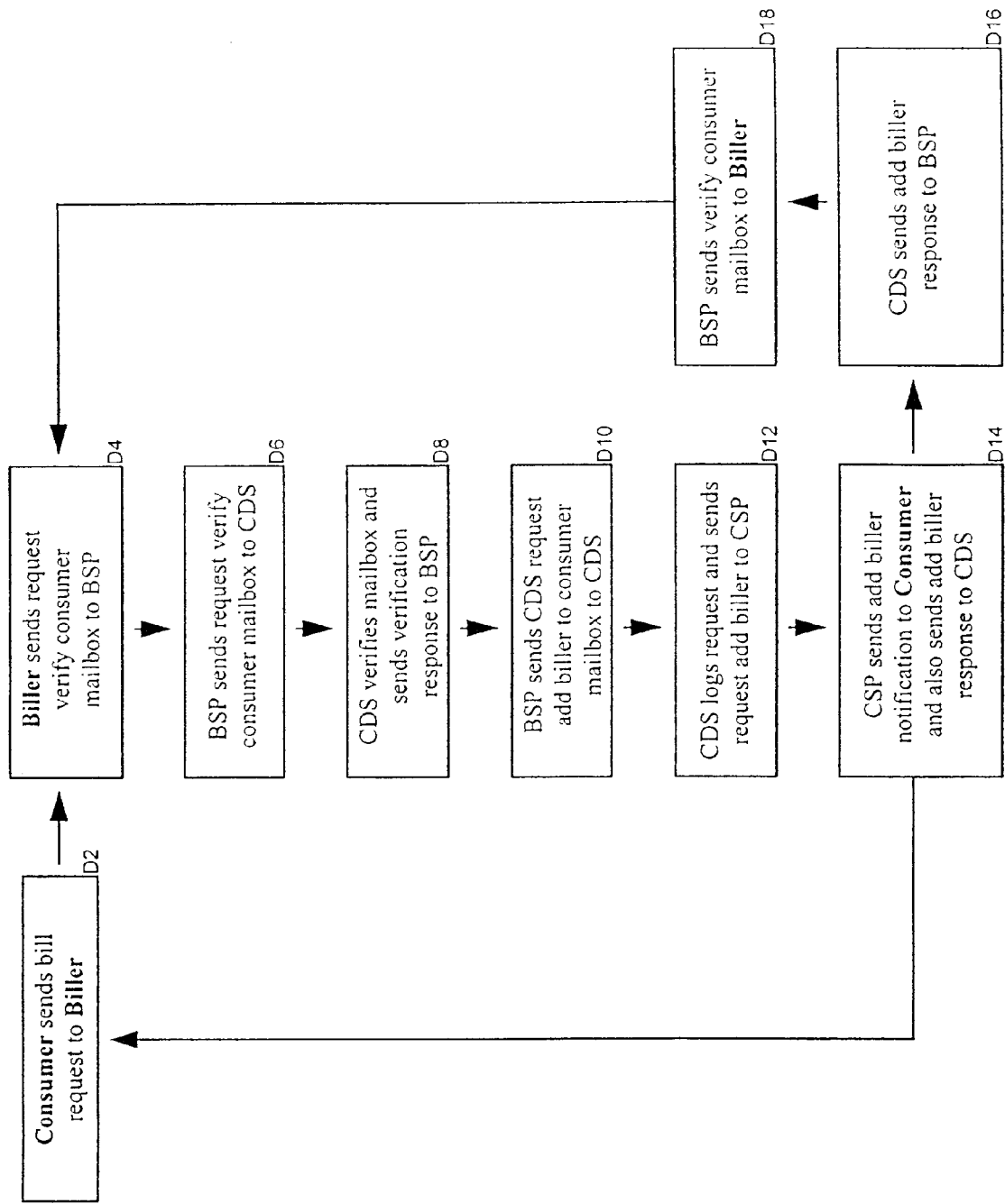
FIG. 11 is a flow chart which provides further detail regarding the process of the alternative of the consumer requesting the biller directly to send electronic bills for an embodiment of the present invention.
Figure 18:
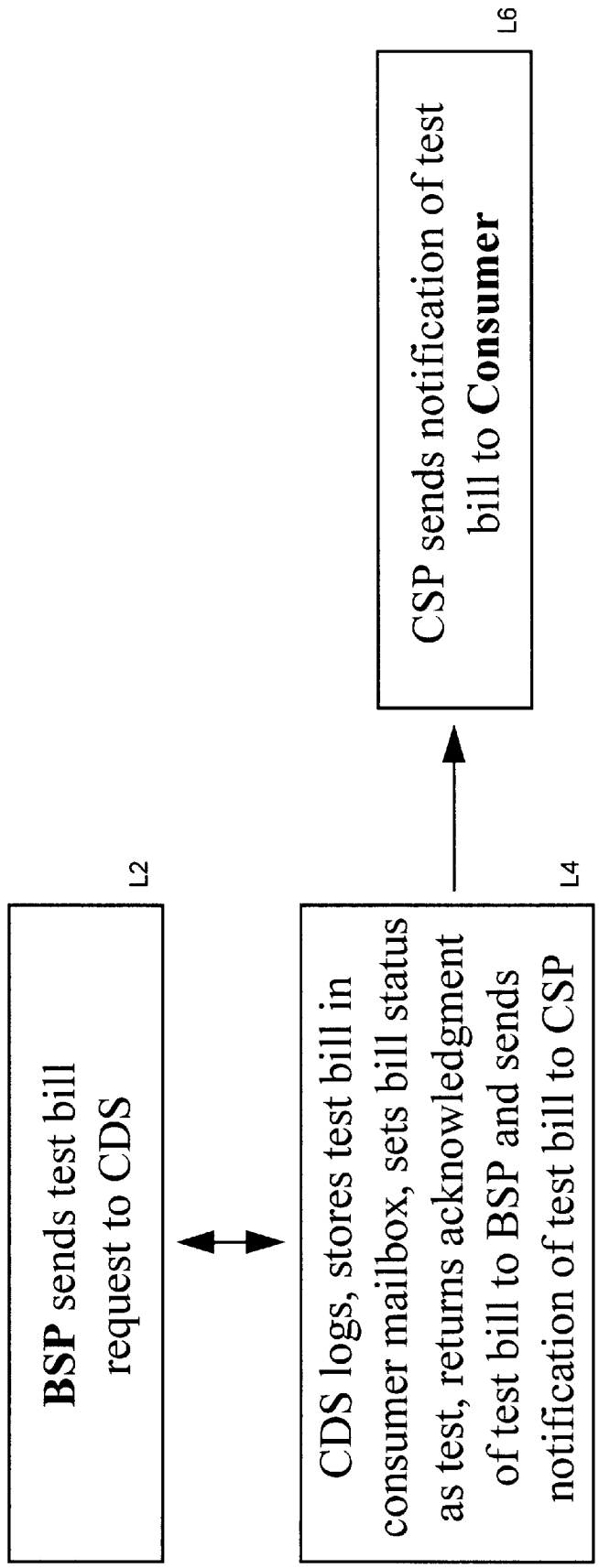
FIG. 18 is a flow chart which provides further detail regarding the process of sending a test bill for the biller for an embodiment of the present invention.

FIG. 10 is a flow chart which provides further detail regarding the process of the consumer 100 requesting electronic bills from the biller 106 via the consumer service provider 102. The consumer 100 must add a biller to the consumer's own bill presenter list after registering for bill presentment and before a bill can actually be received in the consumer's commerce document server mailbox. The consumer 100 may request the consumer service provider 102 to notify the biller 106 via the commerce document server 108 to send electronic bills, as illustrated in FIG. 10, or alternatively, the consumer 100 may notify the biller 108 direct as illustrated in FIG. 11. If the consumer 100 requests the consumer service provider 102 to notify the biller 108, as illustrated in FIG. 10, the consumer 100 sends a request to the consumer service provider 102 for a list of billers that offer electronic billing at C2. The consumer service provider 102 receives the request, retrieves a list of billers that offer electronic billing, sends the list to the consumer 100, and requests the consumer 100 to verify biller information and specify one or more billers from whom electronic billing is desired for the consumer 100 at C4. In step C6, the consumer 100 receives the list and request and sends a response to the consumer service provider 102 specifying the biller 106 who should send electronic bills. At step C8, the consumer service provider 102 receives the response, adds the biller 106 to the consumer's list of electronic billers, and sends a bill delivery request to the commerce document server 108 for electronic billing for the consumer 100 to the consumer mailbox from the biller 106. The commerce document server 108 receives and logs the bill delivery request, determines the bill service provider 104 of the specified biller 106, and sends a request to the biller's service provider 104 to send electronic bills to the consumer 100 at the consumer mailbox for the consumer 100 at C10. In step C12, the bill service provider 104 receives the request and sends a notification to the biller 106 of the request to send electronic bills to the consumer 100 at the consumer mailbox. The biller 106 receives the notification from the bill service provider 104 and makes a decision whether or not to send electronic bills to the particular consumer 100, and if the biller 106 decides to send electronic bills to the consumer 100, the biller 106 sends notification to the bill service provider 104 of the decision to do so at C14. The bill service provider 104 receives the notification and sends a response to the commerce document server 108 that the biller 106 will send electronic bills to the consumer 100 at C16. The commerce document server 108 receives the response and sends a response to the consumer service provider 102 that the biller 106 will send electronic bills at C18. The consumer service provider 102 receives the response and sends a response to the consumer 100 that the biller 106 will send electronic bills in step C20. The bill service provider 104 may also perform a test bill to the consumer 100, as illustrated in FIG. 18, for validation to confirm to the consumer 100 that electronic bills from the biller 106 will be sent in the future. If the biller 106 decides not to send electronic bills to the consumer 100, the biller 106 notifies the consumer 100 that the biller 106 cannot send electronic bills to the consumer 100.

FIG. 11 is a flow chart which provides further detail regarding the process of the alternative of the consumer 100 requesting the biller 106 directly to send electronic bills to the consumer 100. In step D2, the consumer 100 sends a request for electronic billing directly to the biller 106, specifying the biller's customer account for the consumer 100 and the consumer mailbox address for electronic billing for the consumer 100. The request may be sent to the biller 106, for example, by electronic mail, regular mail, telephone, or registering in the biller's web site. At D4, the biller 106 receives the request, verifies the customer, and sends notification to the bill service provider 104 of the consumer 100 and consumer mailbox address for the consumer 100. The bill service provider 104 receives the notification and sends a request to the commerce document server 108 for verification of the consumer mailbox address for the consumer 100 at D6. The commerce document server 108 receives the verification request, verifies that the consumer mailbox for the consumer 100 exists, and sends a response to the bill service provider 104 verifying the consumer mailbox address for the consumer 100 in step D8. In step D10, the bill service provider 104 receives the response and sends a request to the commerce document server 108 to add the biller 106 to the consumer's list of billers for electronic billing. The commerce document server 108 receives and logs the request and sends a pass-through request to the consumer service provider 102 to add the biller 106 to the consumer's list of electronic billers at D12. In step D14, the consumer service provider 102 receives the pass-through request, looks up the consumer's e-bill presenter list to confirm that electronic billing has not been stopped to in regard to the particular biller 106, sends a notification to the consumer 100 that electronic bills will be sent by the biller 106, adds the biller 106 to the consumer's list of electronic billers, and sends a response to the commerce document server 108 confirming the biller 106 has been added to the consumer's list of electronic billers. The commerce document server 108 receives and logs the response confirming the biller 106 has been added to the consumer's list of electronic billers and sends a pass-through response to the bill service provider 104 confirming the biller has been added to the consumers list of electronic billers in step D16. At D18, the bill service provider 104 receives the pass-through response and notifies the biller 106 that the consumer's consumer mailbox address for electronic billing has been verified. As shown in FIG. 18, the bill service provider 104 may also perform a test bill to the consumer 100 for validation to confirm to the consumer 100 that electronic bills will be sent in the future.

Figure 12:
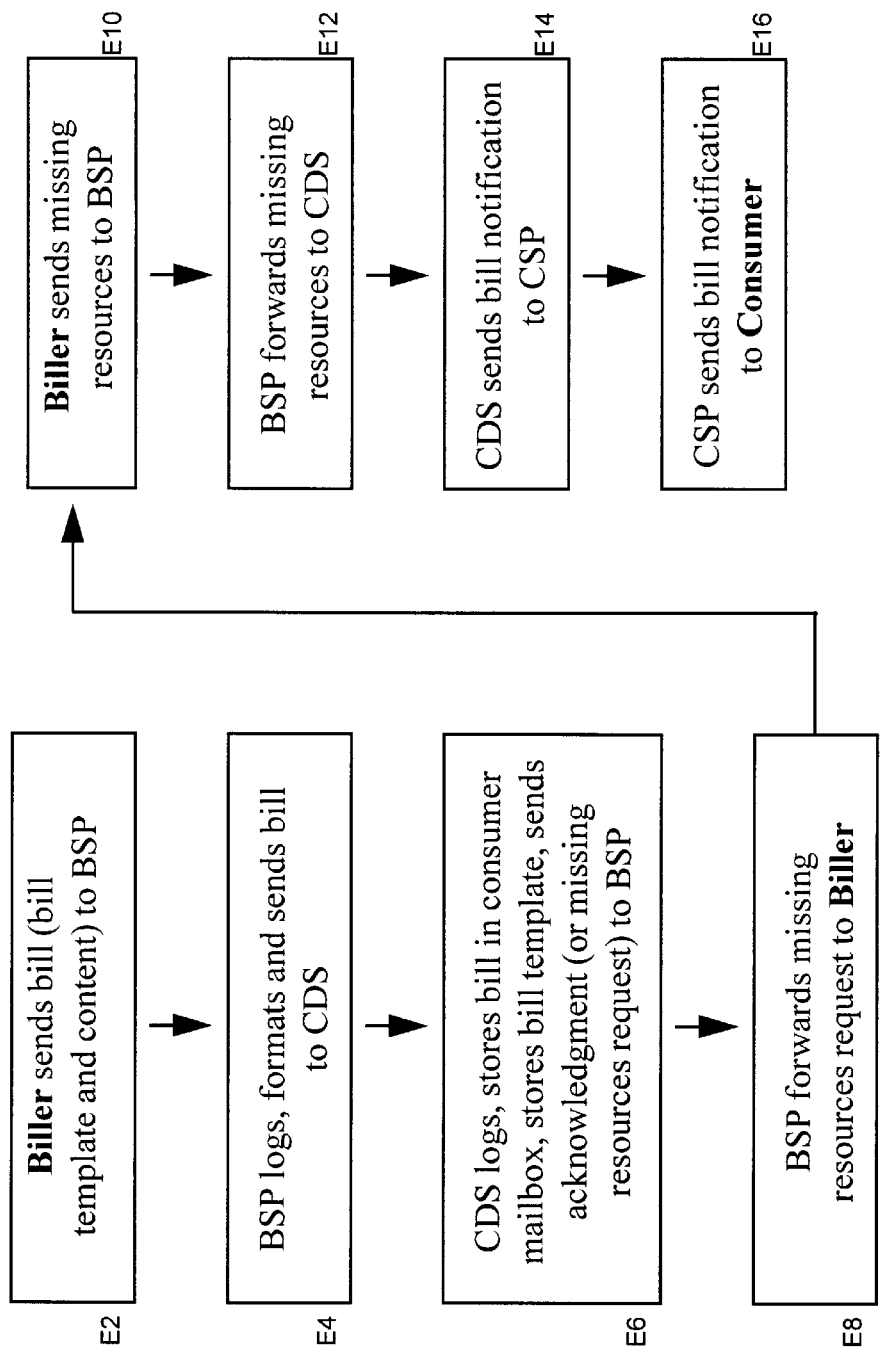
FIG. 12 is a flow chart which provides further detail regarding the process of the biller submitting bills for an embodiment of the present invention.

FIG. 12 is a flow chart which provides further detail regarding the process of the biller 106 submitting bills with resources to the consumer 100. The biller 106 may submit a bill including a bill template, bill content and bill enclosures, as illustrated in FIGS. 30 and 31, to its bill service provider 104 at a given cycle date. Preferably, the submission to the bill service provider 104 includes the resources such as bill template, logo, and enclosures that are required in the bill and which have not previously sent to the commerce document server 108. In step E2, the biller 100 submits the bills for a particular cycle to the bill service provider 104. At E4, the bill service provider 104 receives and logs the bills, determines which bills are to be sent as electronic bills, attaches the appropriate consumer mailbox address to bills that are to be sent electronically, transforms the bills into standard format, packages the bill including resources destined for the commerce document server 108, and submits the packaged bills, including bill template and bill content to the commerce document server 108. In step E6, the commerce document server 108 receives the packaged bills, stores the bills by consumer mailbox address, sets the bill status as new, stores the bill templates, logos and enclosures by biller, and sends an acknowledgment of receipt of the packaged bills to the bill service provider 104. While storing the bill content, also at E6, the commerce document server 108 compiles a list of missing resources referred to in the bill content, and if there are missing resources, the commerce document server 108 also sends a response to the bill service provider 104 requesting missing resources. In that event, the bill service provider 104 receives the response requesting missing resources and, if necessary, forwards a request for missing resources to the biller 106 at E8. Likewise in that event, the biller 106 sends a response with needed resources to the bill service provider 104 in step E10. At E12, the bill service provider 104 sends a response with needed resources to the commerce document server 108. At E14, the commerce document server 108 sends notice of the new bill to the consumer service provider 102, and the consumer service provider 102 forwards the notice to the consumer 100 at E16. Alternatively, at E14, the consumer document server 108 may send notice of the bill to the consumer's e-mail address.

Figure 13:
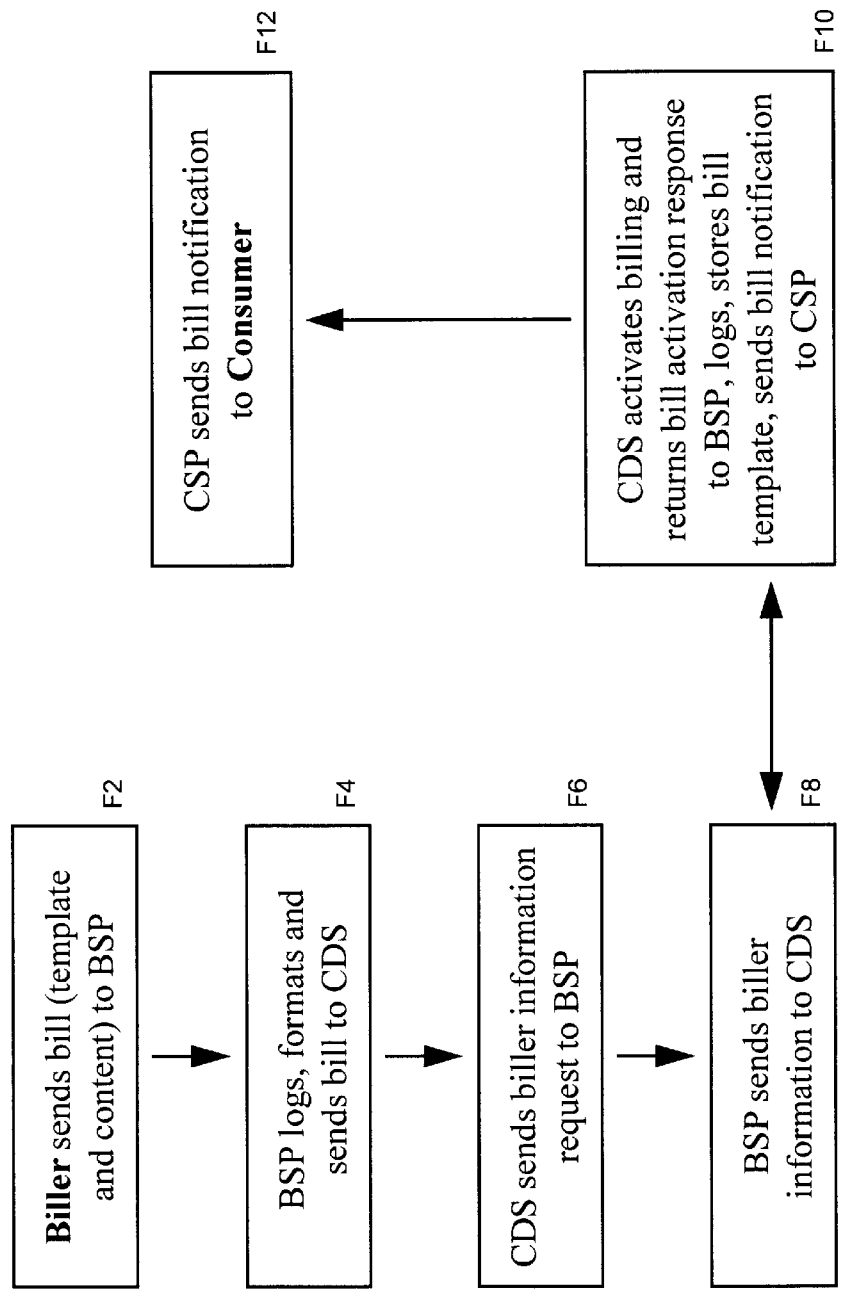
FIG. 13 is a flow chart which provides further detail regarding the process of submitting the bill with other bills from a new biller for an embodiment of the present invention.

FIG. 13 is a flow chart which provides further detail regarding the process of submitting the bill with other bills from a new biller to the consumer 100. As previously mentioned, an alternative way for the bill service provider 104 to inform the commerce document server 108 of a new biller is for the bill service provider 104 to simply wait for the commerce document server 108 to inquire about the new biller when the bill service provider 104 submits the first bill from the new biller to the commerce document server 108. In step F2, the biller 106 submits bills for a particular cycle to the bill service provider 104. The bill service provider 104 receives and logs the bills, determines which bills are to be sent as electronic bills and attaches the appropriate consumer mailbox addresses, transforms those bills into standard format, packages the bills, including resources, destined for a particular commerce document server, and sends the packaged bills, including a bill content and bill template request, to the commerce document server 108 at F4. In step F6, the commerce document server 108 receives the packaged bills and sends an inquiry about the new biller to the bill service provider 104. The bill service provider 104 receives the inquiry and sends a biller information response including a request for billing service activation for the biller 106 to the commerce document server 108 at F8. In step F10, the commerce document server 108 receives the response, activates billing service for the biller 106 and returns a bill activation response to the bill service provider 104. The commerce document server 108 also logs the packaged bills, stores the bills by consumer mailbox address, sets bill status as new, stores the bill templates, logos, and enclosures or resources by biller, and sends a notice that there is a new bill for the consumer 100 to the consumer service provider 102 at F10. In step F12, the consumer service provider 102 sends notice to the consumer 100 of the new bill. Alternatively, in step F10, the commerce document server 108 may send notice of the new bill to the consumer 100 at the consumer's e-mail notification address.

Figure 14:
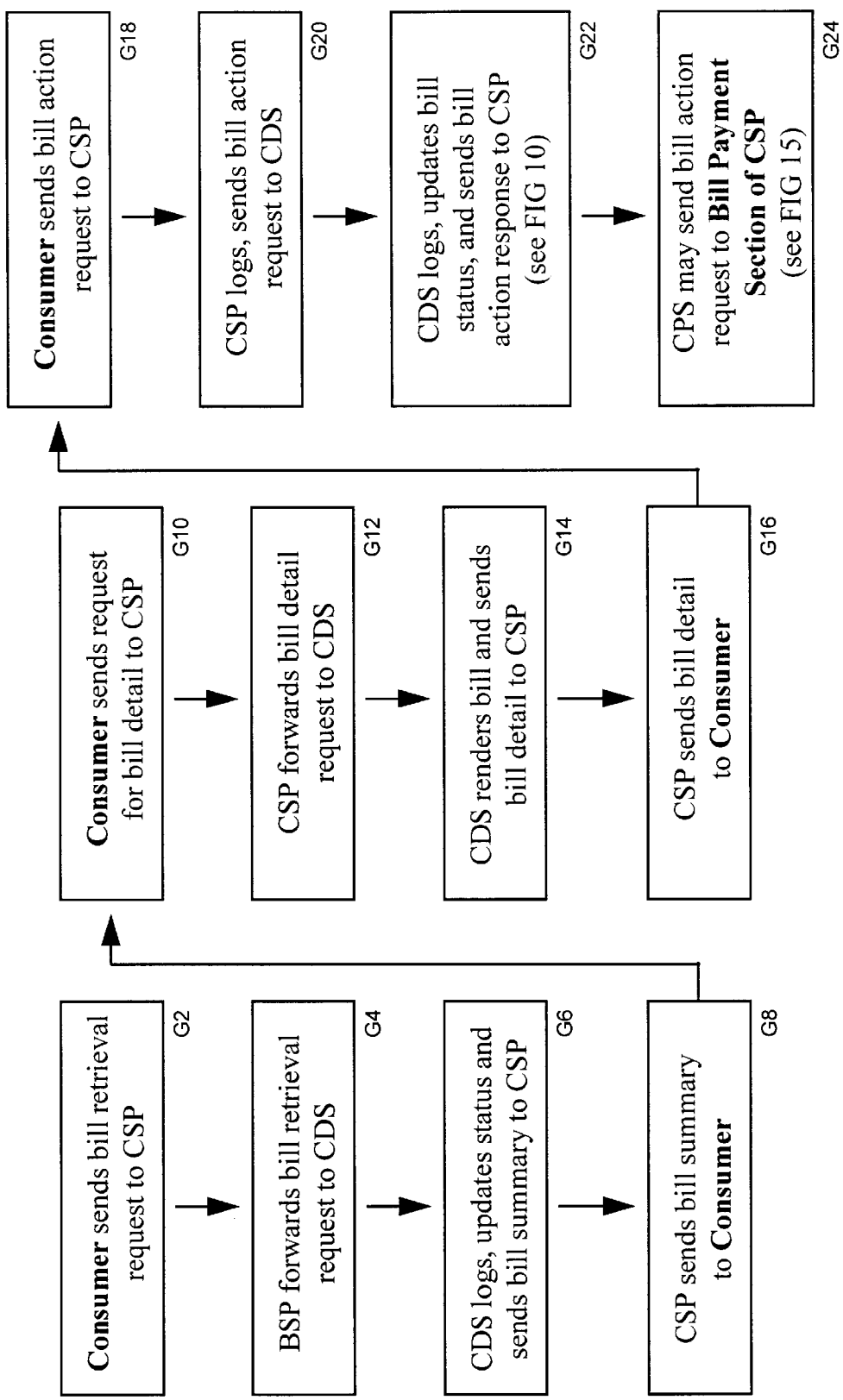
FIG. 14 is a flow chart which provides further detail regarding the process of the consumer retrieving the bill for an embodiment of the present invention.

FIG. 14 is a flow chart which provides further detail regarding the process of retrieving the bill from the biller 106 by the consumer 100. After electronic bill delivery has been specified by the consumer 100 for at least one biller, the consumer 100 may send a request for bills as often as desired. A request for a bill by the consumer 100 may be prompted by receipt by the consumer 100 of notification of the bill. Preferably, the consumer service provider 102 allows the consumer 100 to view a summary of a set of bills that satisfies any of a number of selection criteria, for example, a request to view new bills only, a request to review bills for a specific biller date range, a request to view all unpaid bills, a request to view all bills for a given date range, or a request to view bill detail. At G2, the consumer 100 sends a request to the consumer service provider 102 for bill retrieval, specifying the selection criteria. The consumer service provider 102 receives the request and sends a request to the commerce document server 108 for the consumer's bills, specifying the selection search criteria and the summary fields at step G4. In step G6, the commerce document server 108 receives the request and updates the status of each new bill as presented and logs in the bill history, and the commerce document server 108 sends the bill set to the consumer service provider 102 with summary fields only. The consumer service provider 102 receives the bill set, formats a bill summary, and presents the bill summary to the consumer 100 at G8. At step G10, the consumer 100 may also request bill detail from the consumer service provider 102 as often as desired. The consumer service provider 102 receives the request and sends a bill statement request, specifying if bill rendering is required, to the commerce document server 108 at G12. In step G14, the commerce document server 108 receives the request, and if bill rendering is required, merges the bill content with the template and renders the bill, logs bill rendering, and sends a bill statement response to the consumer service provider 102. The consumer service provider 102 receives the bill statement response and sends a bill display detail to the consumer 100 at G16. The consumer 100 receives the bill display detail and may then specify to the consumer service provider 102 the action to be taken on the bill at G18. The consumer 100 may request the consumer service provider 102 to pay the bill through the consumer service provider's bill payment system, in which case the consumer service provider 102 logs the bill payment request and sends a bill action request to the commerce document server 108 at G20. At G22, the commerce document server 108 receives the bill action request, updates the bill status and logs in the bill history and sends a bill action response to the consumer service provider 102. If requested to pay the bill, the consumer service provider 102 may send a bill payment request to its bill payment section in step G24, as illustrated in FIG. 15.

Figure 15:
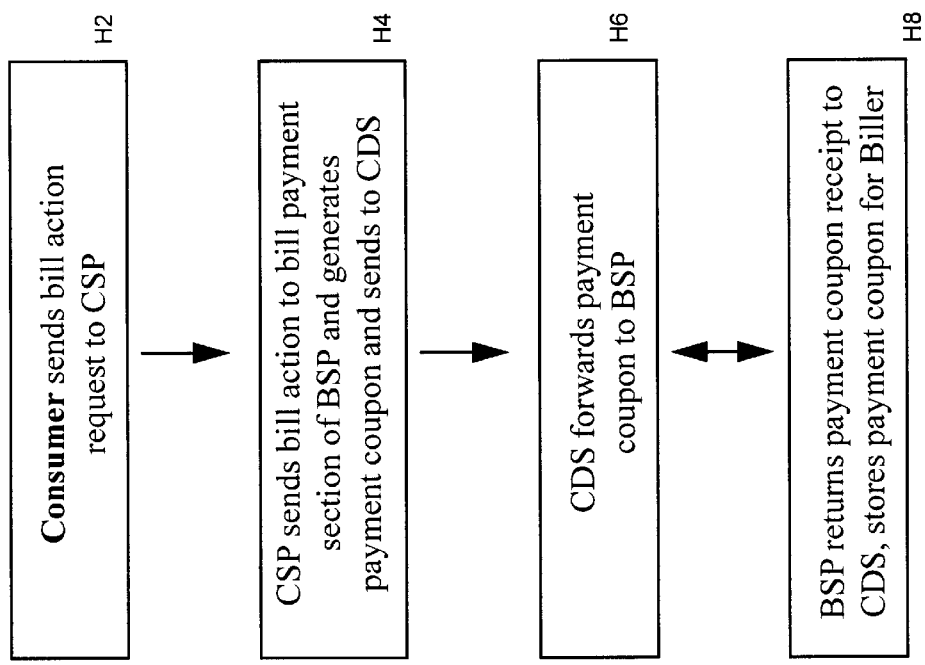
FIG. 15 is a flow chart which provides further detail regarding the process of payment of the bill by the consumer via the consumer service provider's bill payment system for an embodiment of the present invention.

FIG. 15 is a flow chart which provides further detail regarding the process of payment of the bill from the biller 106 by the consumer 100 via the consumer service provider's payment system. Upon receipt of the bill, the consumer 100 may send a request to the consumer service provider 102 for payment of the bill via the consumer service provider's payment system at H2. In step H4, upon receipt of the request, the consumer service provider 102 sends a payment request to its bill payment system. Also at H4, for each payment authorization sent by the consumer service provider 102 to its bill payment system, the consumer service provider 102 generates a payment coupon to be returned to the biller 106, which includes payment information inputted by the consumer 100 as specified by the biller 106 in the consumer input template, and sends the payment coupon for the biller 106 to the commerce document server 108. The commerce document server 108 receives the payment coupon and passes the payment coupon to the bill service provider 104 at H6. In step H8, the bill service provider 104 receives the payment coupon, returns an acknowledgment of receipt of the payment coupon to the commerce document server 108, and stores the payment coupon for the biller 106, which is used to reconcile payments received.

Figure 16:
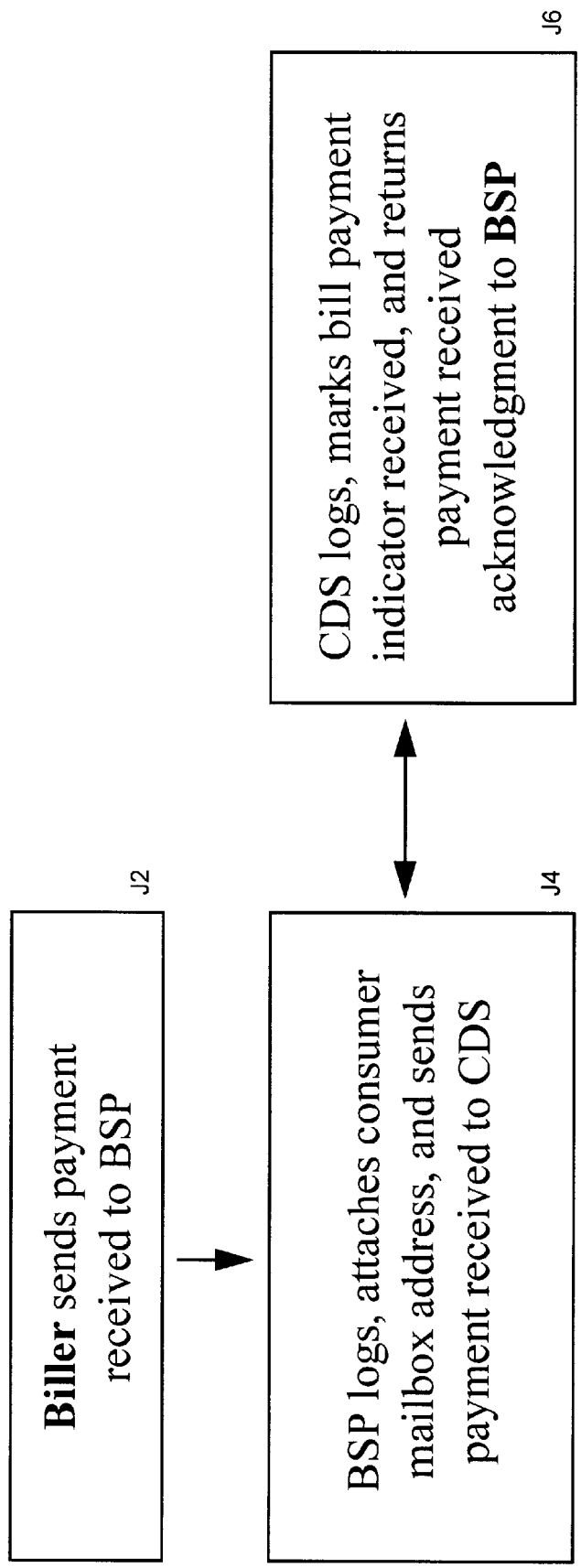
FIG. 16 is a flow chart which provides further detail regarding the process of acknowledging payment received by the biller for an embodiment of the present invention.
Figure 17:
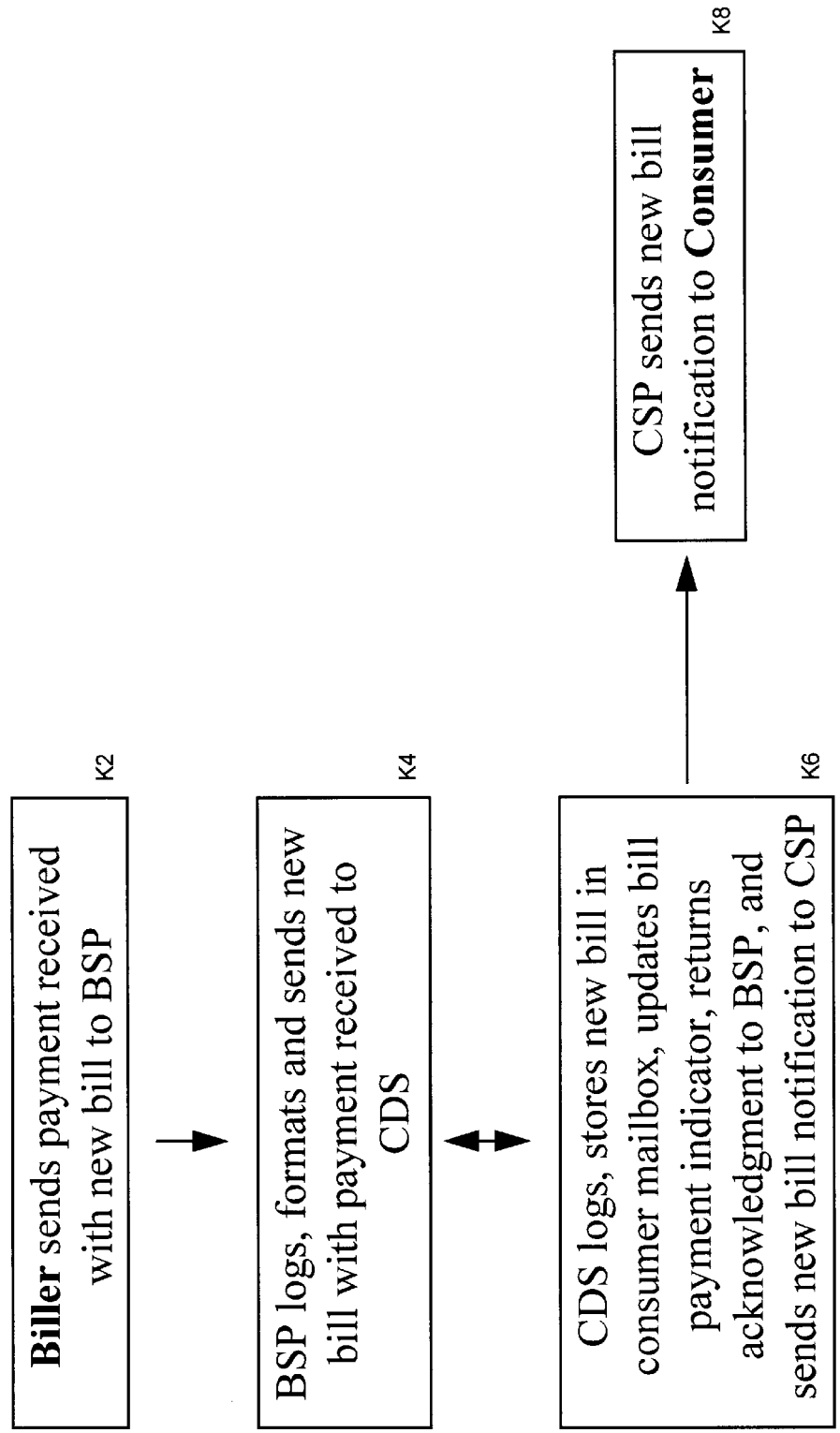
FIG. 17 is a flow chart which provides further detail regarding the process of acknowledging payment received with new bills by the biller for and embodiment of the present invention.

FIG. 16 is a flow chart which provides further detail regarding the process of acknowledging payment received by the biller 106 from the consumer 100. The biller 106 may submit an acknowledgment of receipt for payment of the bill either separately as illustrated in FIG. 16 or included in a new bill to the consumer 100 as illustrated in FIG. 17. Referring to FIG. 16, at step J2, the biller 106 may submit the acknowledgment for payment received to the bill service provider 104 separately. The bill service provider receives the acknowledgment, logs bill payment received, determines which payment was made for an electronic bill, attaches the consumer mailbox address, and sends a payment received request to the commerce document server 108 at J4. In step J6, the commerce document server 108 receives and logs the payment received request, marks the bill payment indicator for the bill as received, and returns an acknowledgment of payment received to the bill service provider 104.

FIG. 17 is a flow chart which provides further detail regarding the process of acknowledging payment received by the biller 106 from the consumer 100 with new bills from the biller 106 for the consumer 100. In step K2, the biller 106 submits the payment received acknowledgment to the bill service provider 104 with a new bill for the consumer 100. At K4, the bill service provider 104 receives and logs bill payment received, determines which of the new bills are to be sent as electronic bills, attaches the consumer mailbox address, transforms the new bills into standard format, packages the new bills, including resources, and submits the packaged bills, including bill content request, together with payment receipt, to the commerce document server 108. At step K6, the commerce document server 108 receives and logs payment receipt, updates the payment indicator of the bill, returns acknowledgment of receipt of the packaged bills to the bill service provider 104, and sends notice of the new bill to the consumer service provider 102. At K8, the consumer service provider 102 sends notice of the new bill to the consumer 100. Alternatively, the commerce document server 108 may notify the consumer 100 of the new bill at the consumer's e-mail notification address. When the consumer 100 retrieves the new bill, the new bill that included payment acknowledgment indicates the payment received in summary detail, and the consumer 100 can also view the previous bill and see that payment was received.

FIG. 18 is a flow chart which provides further detail regarding the process of sending a test bill for the biller 106 to the consumer 100. The bill service provider 104 has the option of submitting a test bill when the consumer 100 first requests electronic billing, or when there is a change of the consumer's electronic billing address, to verify that a bill from the biller 106 can be delivered to the consumer 100. Additionally, a test bill can serve as confirmation to the consumer 100 that electronic billing has been properly set up. Further, the bill service provider 104 can also request the commerce document server 108 to perform and return a test rendering. The test bill request is the same as a regular bill content message, except that the test bill contains canned test data. Referring to FIG. 18, the bill service provider 104 sends a test bill request for the consumer 100 to the commerce document server 108 at step L2. In step L4, the commerce document server 108 receives and logs the test bill request, confirms that all needed resources are available, and if not, creates a request message to the bill service provider 104 for needed resources, to which the bill service provider 104 responds by sending the needed resources to the commerce document server 108. Likewise in step L4, the commerce document server 108 returns a response to the bill service provider 104 with an acknowledgment of the test bill request, which may include a fully rendered test bill if rendering was specified, stores the test bill in the consumer mailbox, sets the bill status as test (to be deleted once delivered), and sends notice of the test bill to the consumer service provider 102. At step L6, the consumer service provider 102 sends notice of the test bill to the consumer 100. Alternatively, the commerce document server 108 may send notice of the test bill to the consumer's e-mail address.

Figure 19:
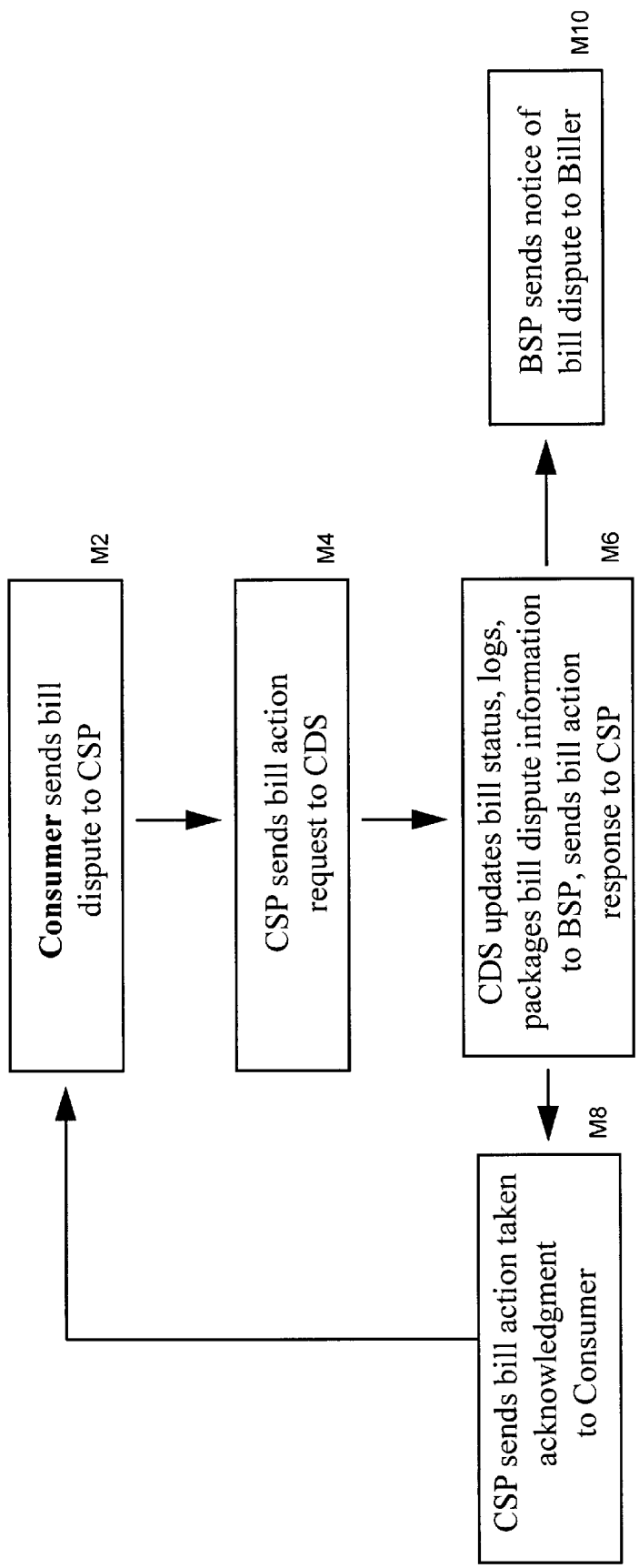
FIG. 19 is a flow chart which provides further detail regarding the process of the consumer disputing a bill for an embodiment of the present invention.
Figure 21:
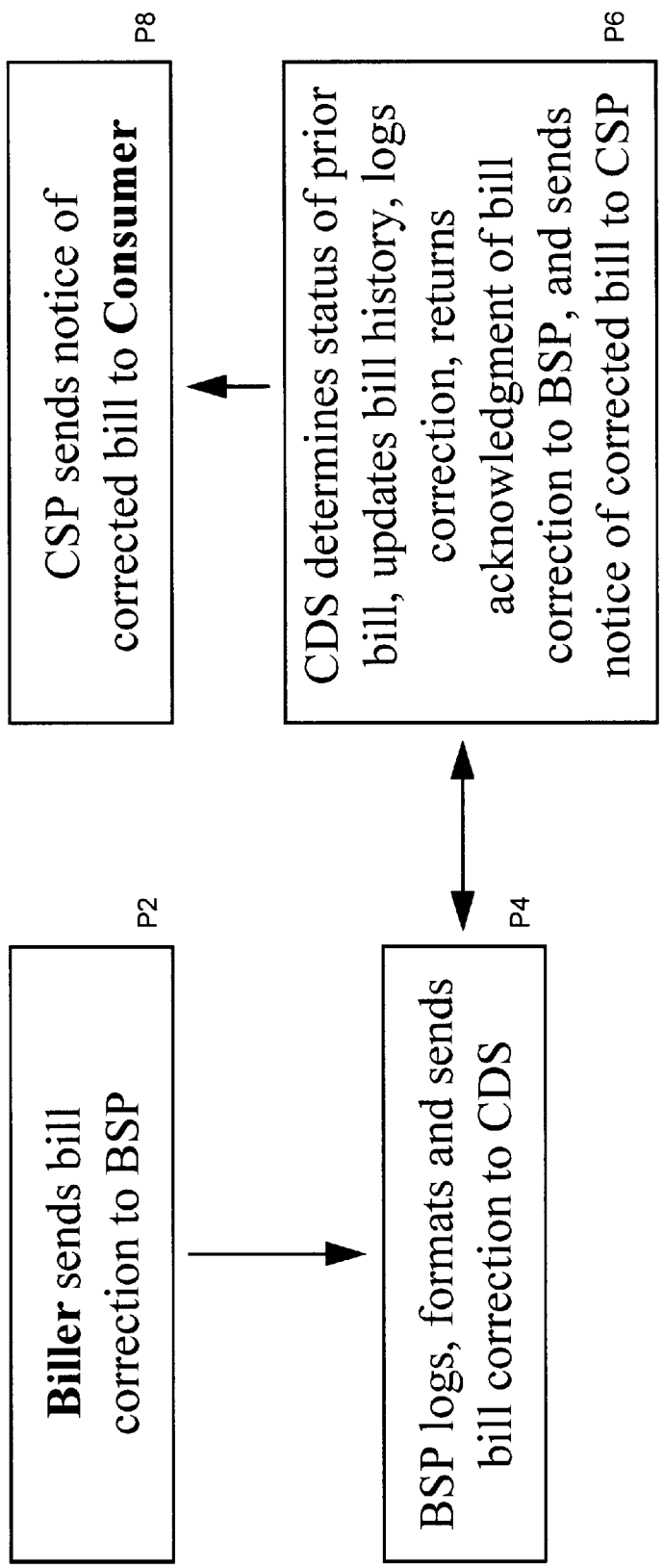
FIG. 21 is a flow chart which provides further detail regarding the process of the biller correcting the bill for an embodiment of the present invention.

FIG. 19 is a flow chart which provides further detail regarding the process of the consumer 100 disputing a bill from the biller 106. Following the bill presentment function via the consumer service provider 102 and upon retrieving the bill, the consumer 100 may decide to dispute the bill or a portion of the bill, which was presented either in the form of summary information about the bill or the bill detail. Upon retrieval of the bill by the consumer 100, the consumer 100 may specify to the consumer service provider 102 the action to be taken on the bill, including payment or full or partial bill dispute of the bill at step M2. If the bill is disputed, the specification by the consumer 100 to the consumer service provider 102 must include pertinent information required for the bill dispute. Upon receipt of the specification from the consumer 100 for payment or for full or for partial bill dispute, the consumer service provider 102 sends a request to its bill payment system for bills instructed to be paid and also sends a bill action request for partially disputed bills to the commerce document server 108 at step M4. Upon receipt of the bill action request, the commerce document server 108 updates bill status based on the action, logs in the bill history, packages the bill dispute information for the bill service provider 104, returns a bill action response to the consumer service provider 102, and sends a notice of bill dispute request to the bill service provider 104 at M6. In step M8, the consumer service provider 102 receives the bill action response from the commerce document server 108 and sends an acknowledgment of bill action taken to the consumer 100. At step M10, the bill service provider 104 receives the bill dispute request from the commerce document server 108, sends a bill dispute response to the commerce document server 108 and sends a notice of bill dispute to the biller 106. Upon receiving the notice of bill dispute, the biller 106 verifies the bill information and, if necessary, submits a bill correction as shown in FIG. 21 to resolve the dispute. Optionally, the biller 106 may notify the consumer 100 of the action taken to resolve the dispute either direct by e-mail or via the consumer service provider 102.

Figure 20:
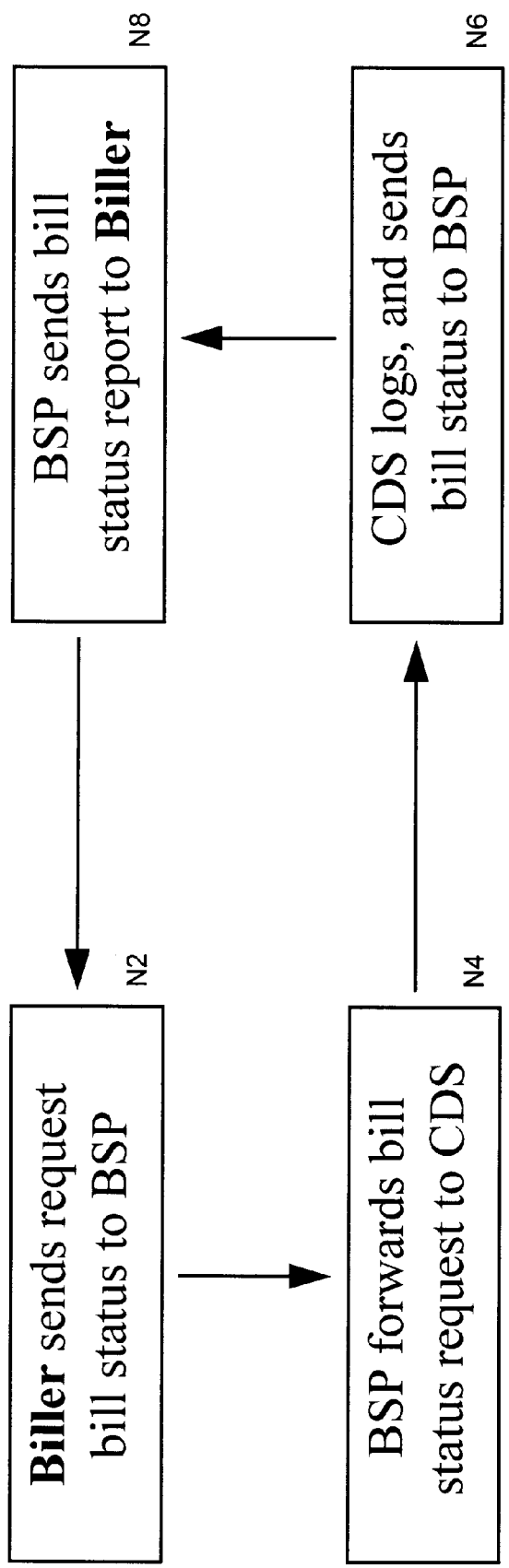
FIG. 20 is a flow chart which provides further detail regarding the process of the biller requesting status of the bill for an embodiment of the present invention.

FIG. 20 is a flow chart which provides further detail regarding the process of the biller 106 requesting information about the status of a bill from the biller 106 to the consumer 100. The biller 106 sends a request to the bill service provider 104 for bill status of the bill at step N2. Upon receipt of the bill status request, the bill service provider 104 sends a bill status request specifying the search criteria to the commerce document server 108 at N4. Upon receipt of the bill status request, the commerce document server 108 logs the bill status, and sends the bill status for the bill satisfying the search criteria to the bill service provider 104 in step N6. Upon receipt of the bill status information, the bill service provider 104 aggregates the bill status information into a report, including payment information, dispute indicator and correction indicator and sends a bill status report for the bill to the biller 106 at N8.

FIG. 21 is a flow chart which provides further detail regarding the process of the biller 106 sending a bill correction with invalidation of the bill from the biller 106 to the consumer 100. When the biller 106 realizes that a submitted bill was erroneous, the biller 106 may submit a bill correction to invalidate an erroneous bill which was already stored by the commerce document server 108. The biller 106 sends the bill service provider 104 a bill correction at step P2. The bill service provider 104 receives the bill correction, logs receipt of the bill correction, transforms the bill correction into standard format, specifies the identification of the previous bill, and packages the bill correction with other bills and resources destined for the commerce document server 108, and submits packaged bills, including the bill correction request to the commerce document server 108 in step P4. Upon receipt, the commerce document server 108 determines the status of the previous bill, i.e., if the previous bill has not been delivered, the bill correction supersedes the previous bill and the previous bill may be deleted. If the previous bill has been delivered, the bill correction is stored by the commerce document server 108 as a new bill, and the previous bill is marked as invalid. The commerce document server 108 also updates the bill history, logs the bill correction, sends the bill service provider 104 an acknowledgment of receipt for the packaged bills, including a bill correction response, and sends notice of the bill correction to the consumer service provider 102 at P6. In step P8, the consumer service provider 102 receives the notice and sends notice of the correction to the consumer 100. Alternatively, the commerce document server 108 may notify the consumer of the correction by e-mail.

Figure 22:
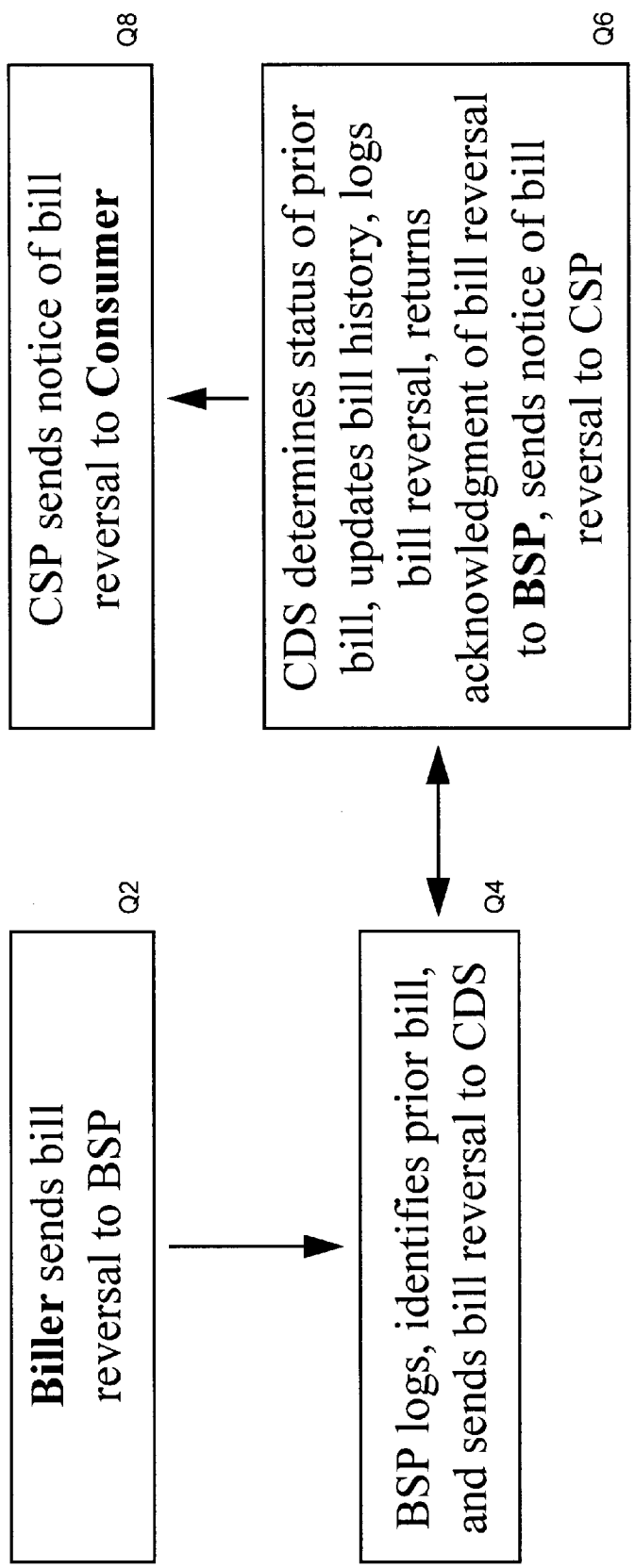
FIG. 22 is a flow chart which provides further detail regarding the process of the biller reversing the bill for an embodiment of the present invention.

FIG. 22 is a flow chart which provides further details regarding the process of the biller 106 reversing the bill to the consumer 100 after it is submitted. When the biller 106 realizes that the submitted bill is completely wrong, for example, sent to the wrong consumer, a bill reversal may be sent. At step Q2, the biller 106 submits a bill reversal for the bill to the bill service provider 104. The bill service provider 104 receives the bill reversal, logs receipt of the bill reversal, identifies the bill identification of the previous bill being reversed, packages the bill reversal (specifying the identification of the bill being reversed) with other bills and resources destined for the commerce document server 108, and submits the packaged bills, including the bill reversal request to the commerce document server 108 at Q4. The commerce document server 108 receives the bill reversal request, determines the status of the previous bill, and if not presented, marks the previous bill as invalid or as not to be delivered. If the previous bill was already presented, the commerce document server 108 marks the previous bill as invalidated (but the consumer 100 may be allowed to retrieve the bill again), sends an acknowledgment of receipt of packaged bills including bill reversal response to the bill service provider 104, and sends notice to the consumer service provider 102 of the bill reversal at Q6. Upon receipt of the notice of bill reversal, the consumer service provider 102 sends a notice of the bill reversal to the consumer 100 in step Q8. Alternatively, the commerce document server 108 may notify the consumer of the bill reversal by e-mail.

Figure 23:
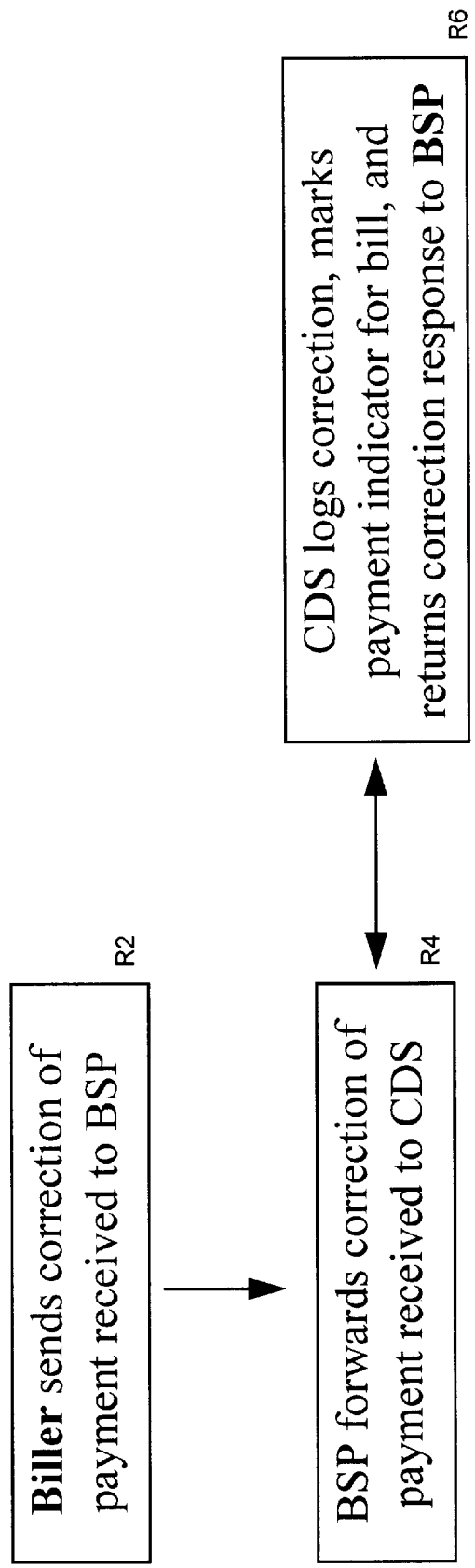
FIG. 23 is a flow chart which provides further detail regarding the process of the biller correcting a previous acknowledgment of receipt of payment of the bill for and embodiment of the present invention.
Figure 24:
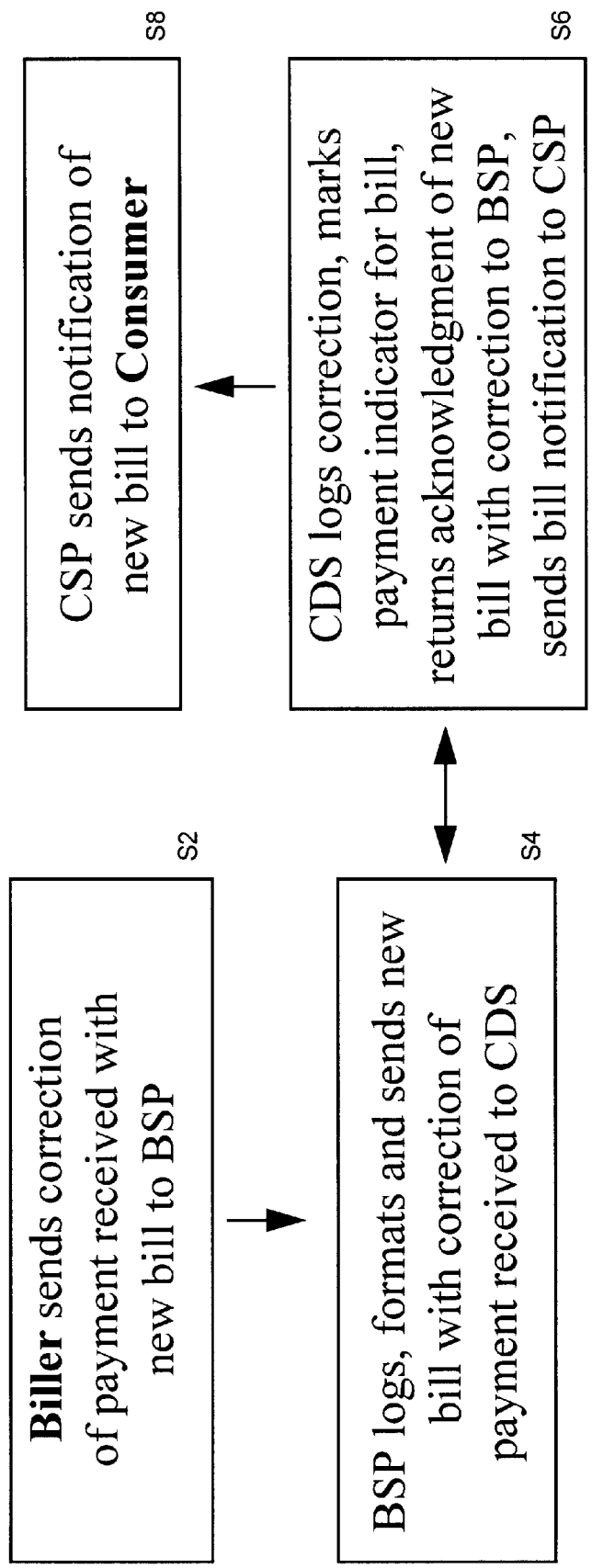
FIG. 24 is a flow chart which provides further detail regarding the process of the biller correcting the acknowledgment of receipt of payment of the bill with a new bill for an embodiment of the present invention.

FIG. 23 is a flow chart which provides further detail regarding the process of the biller 106 correcting a previous acknowledgment of receipt of payment of the bill by the consumer 100. The biller 106 can submit a request for correction/reversal of an acknowledgment of payment received either separately as illustrated in FIG. 23 or together with a new bill as illustrated in FIG. 24. If submitted separately, the biller 106 submits a payment received correction/reversal to the bill service provider 104 at step R2. Upon receipt, the bill service provider 104 submits the payment received correction/reversal to the commerce document server 108 in step R4. The commerce document server 108 receives and logs receipt of the bill payment received correction/reversal, marks the payment indicator for the bill, and acknowledges receipt of the bill payment received correction/reversal to the bill service provider 104 in step R6.

FIG. 24 is a flow chart which provides further detail regarding the process of the biller 106 correcting the acknowledgment of receipt of payment of the bill by the consumer 100 with a new bill for the consumer 100. In step S2, the biller 106 sends the correction with new bills to the bill service provider 104. Upon receipt, the bill service provider 104 logs the bill payment received correction, determines which new bills are to be sent as electronic bills and attaches the appropriate consumer mailbox address, transforms those bills into standard form, packages the new bills, including resources destined for the commerce document server 108, and submits the packaged bills to the commerce document server 108, together with the request for correction at S4. The commerce document server 108 receives and logs the payment correction, updates the payment indicator for the previous bill, sends acknowledgment of receipt of packaged bills to the bill service provider 104, and sends notice of the new bill to the consumer service provider 102 at S6. The consumer service provider 102 sends notice of the new bill to the consumer 100 at S8. Alternatively, the commerce document server 108 may notify the consumer 100 of the new bill by e-mail. When the consumer 100 retrieves the bills, the new bill that includes the payment correction indicates the payment correction in summary or detail, and the consumer 100 can also look up the previous bill and see the payment correction.

Figure 29:
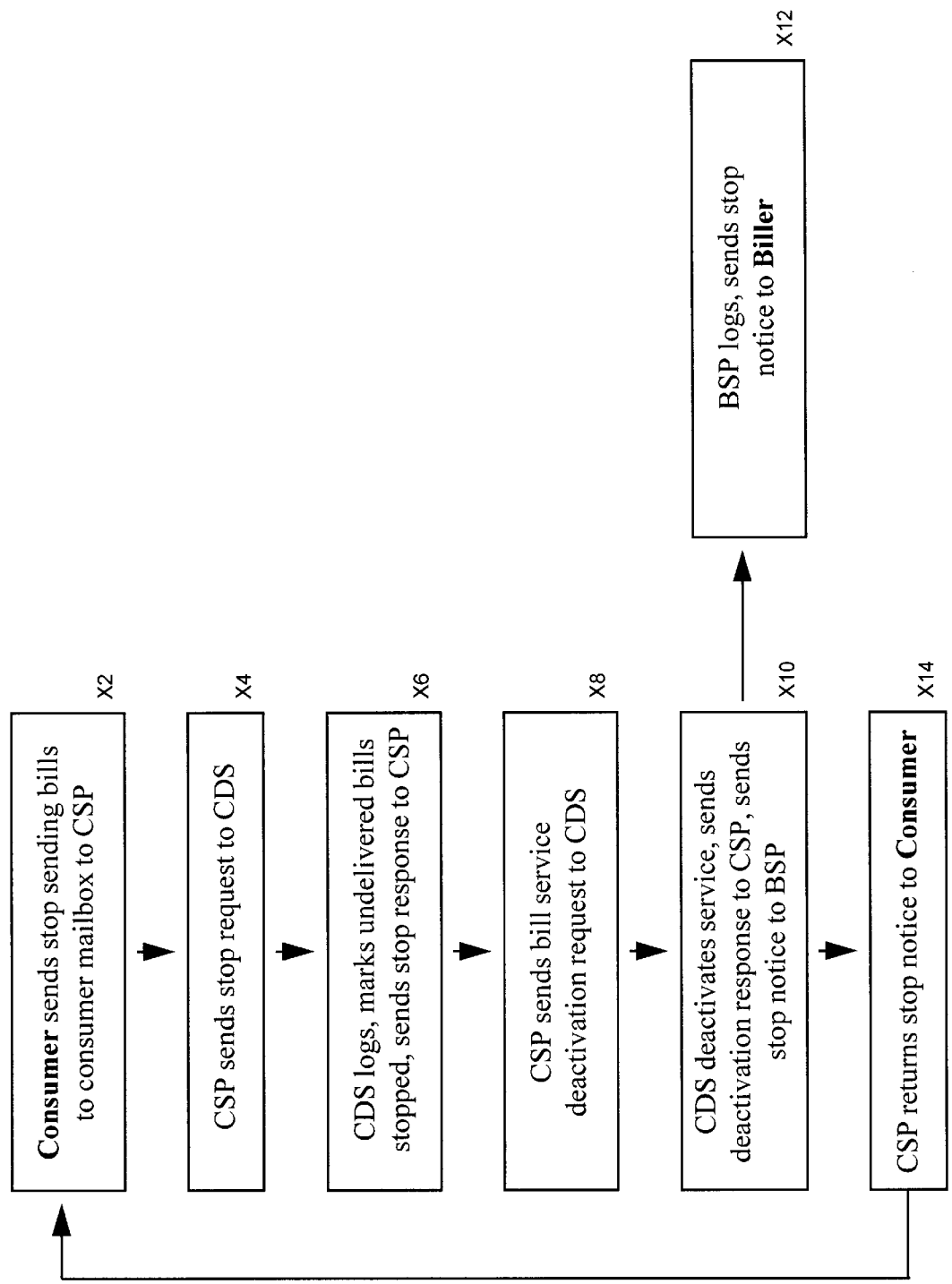
FIG. 29 is a flow chart which provides further detail regarding the process of the consumer stopping electronic billing for an embodiment of the present invention.

When a consumer 100 decides to change consumer service providers, there are several steps to execute the change, including the consumer 100 signing up for bill presentment to a new consumer service provider as illustrated in FIG. 9, the consumer 100 adding new electronic billers as illustrated in FIGS. 10 and 11, and the consumer 100 stopping electronic billing via the old consumer service provider as illustrated in FIG. 29. The transfer of electronic billers from the old consumer to a new consumer service provider may be accomplished by transferring electronic billers from the old consumer service provider to the new consumer service provider, or off-line by the new consumer service provider to the old consumer service provider, or by the commerce document server 108 acting as an intermediary, and the consumer 100 stopping bill presentment on the old consumer service provider.

Figure 25:
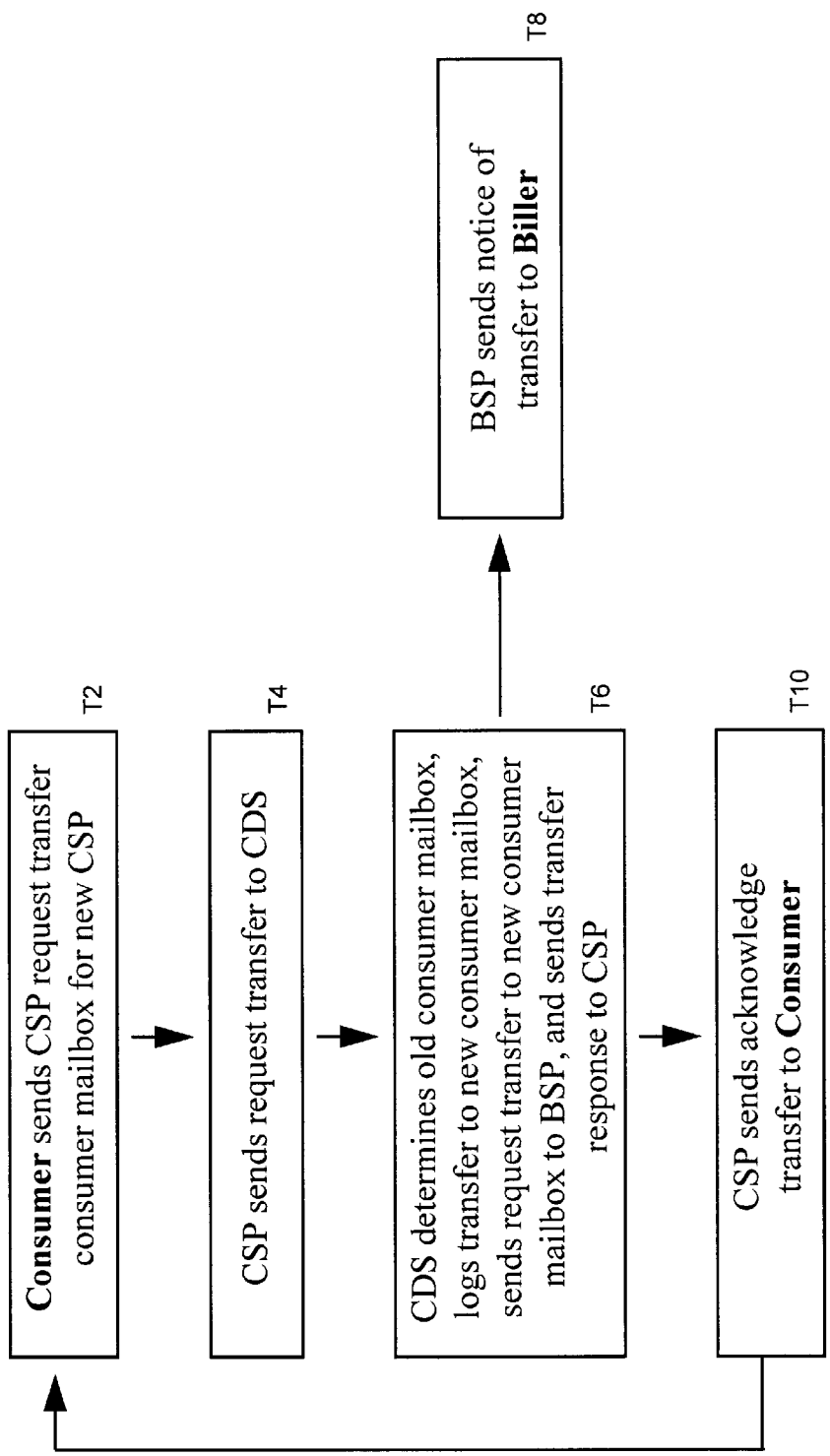
FIG. 25 is a flow chart which provides further detail regarding the process of the consumer transferring to a new consumer service provider for an embodiment of the present invention.

FIG. 25 is a flow chart which provides further detail regarding the process of the consumer 100 transferring to a new consumer service provider via the old consumer service provider 102. In step T2, the consumer 100 sends a request to the consumer service provider 102 for transfer of electronic billers from the old electronic mailbox. The consumer service provider 102 receives the request, and sends the request to transfer electronic billers to the commerce document server 108 at step T4. The commerce document server 108 receives the request, looks up the consumer's old electronic mailbox address, retrieves the consumer's list of electronic billers, logs the request, sends a request to send bills for the consumer 100 to a new consumer mailbox address to the bill service provider 104, and sends a transfer of electronic billers response to the consumer service provider 102 in step T6. The bill service provider 104 receives the request from the commerce document server 108 and sends a notice to the biller 106 of the consumer's new consumer mailbox address at T8. The consumer service provider 102 receives the transfer response from the commerce document server 108 and sends a transfer response to the consumer 100 at T10. Since the consumer 100 may have numerous billers sending electronic bills to the old consumer mailbox address via the old consumer service provider 102, at step T6, the commerce document server 108 may send the consumer's list of electronic billers to the consumer service provider 102, which in turn sends the consumer's list of electronic billers to the consumer 100. The consumer 100 then sends confirmation of which electronic billers should be transferred to the new consumer service provider, which in turn sends the confirmation to the commerce document server 108. The commerce document server 108 then sends a confirmation response to the consumer service provider 102.

Figure 26:
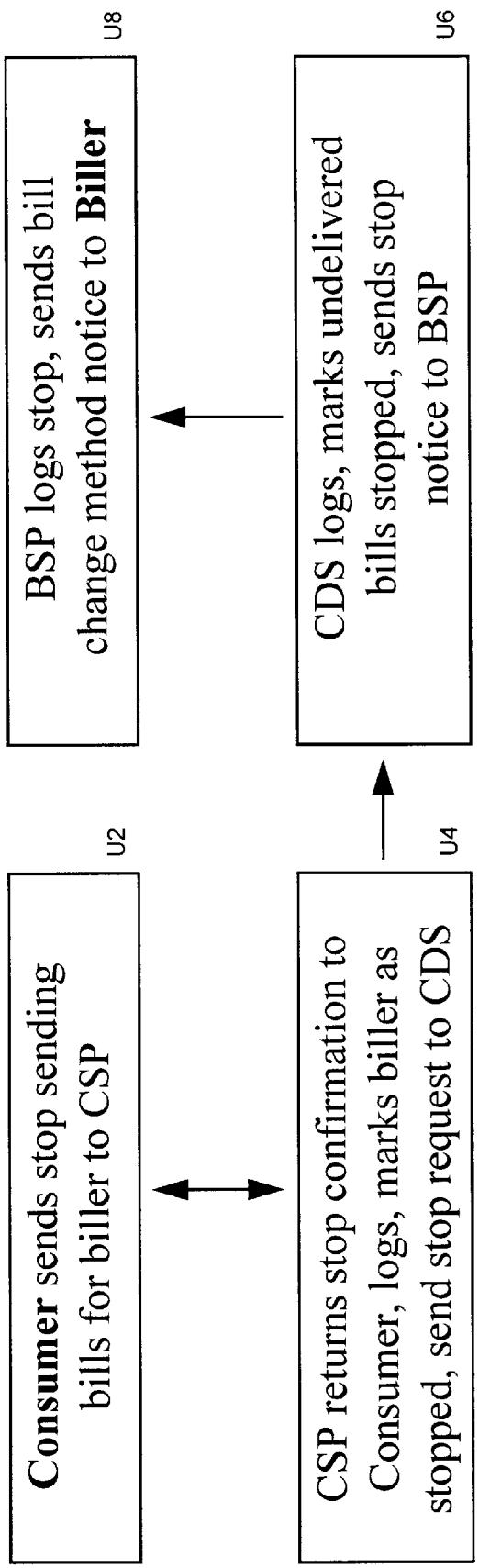
FIG. 26 is a flow chart which provides further detail regarding the process of the consumer stopping electronic billing from the biller for an embodiment of the present invention.

FIG. 26 is a flow chart providing further detail regarding the process of the consumer 100 stopping electronic billing from the biller 106. In step U2, the consumer 100 sends a request to stop electronic billing for the consumer 100 from the particular biller 106 to the consumer service provider 102. Upon receipt of the request, the consumer service provider 102 logs receipt of the request, marks the biller 106 as stopped in the consumer's list of electronic billers, sends notice that electronic billing from the biller 106 will stop to the consumer 100, and sends a stop electronic billing request to the commerce document server 108 at U4. Upon receipt of the stop electronic billing request by the commerce document server 108, the commerce document server 108 logs the stop electronic billing request, marks all undelivered bills in the consumer mailbox for the consumer 100 from the specified biller 106 as stopped, logs rejected bill delivery stopped, and sends a notice to stop electronic billing for the consumer 100 from the biller 106 to the bill service provider 104 in step U6. The bill service provider 104 receives the notice to stop electronic billing for the consumer 100 from the commerce document server 108, changes the billing method for the consumer 100 to paper bills, logs the billing method change, and notifies the biller 106 of the stop electronic billing request for the consumer 100 at step U8.

Figure 27:
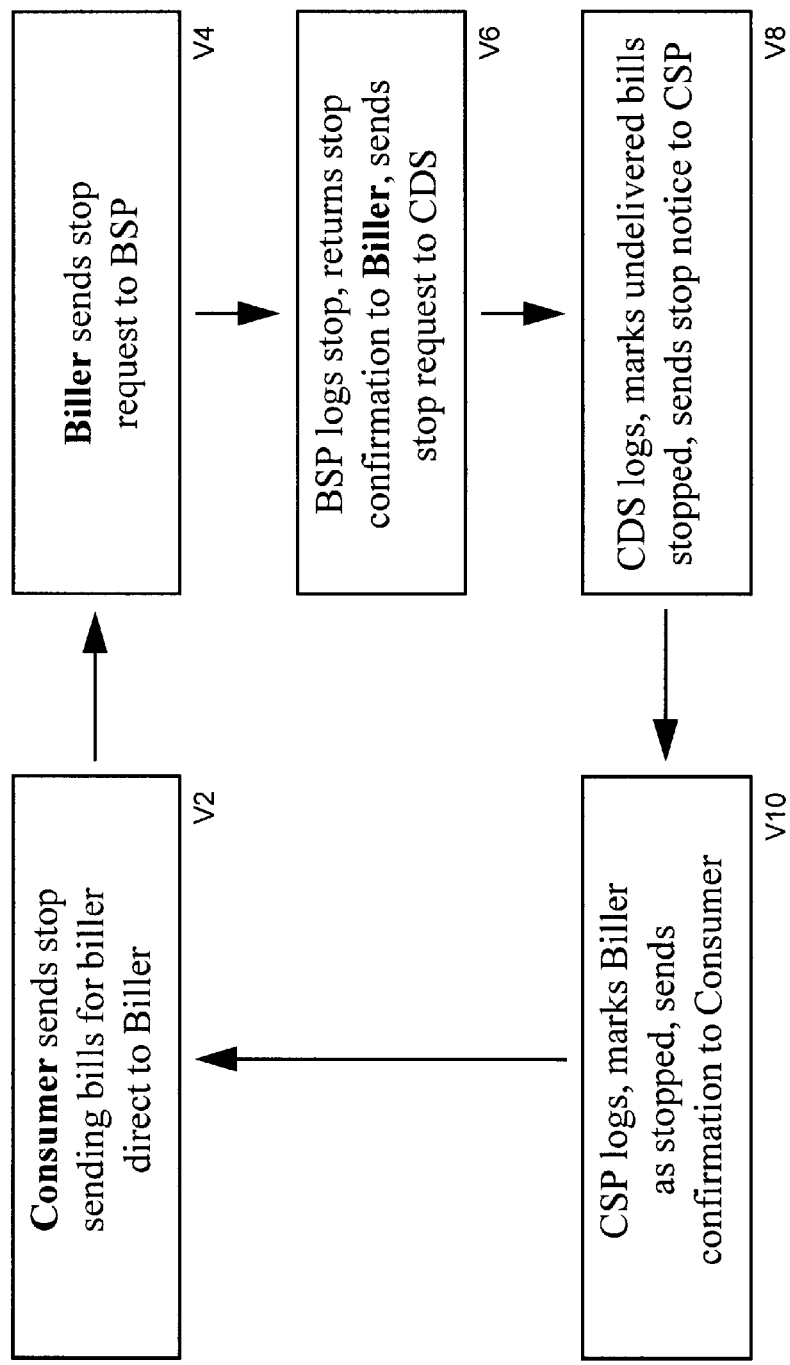
FIG. 27 is a flow chart which provides further detail regarding the process of the consumer requesting the biller directly to stop electronic billing to the consumer for and embodiment of the present invention.

FIG. 27 is a flow chart providing further detail regarding the process of the consumer 100 requesting the biller 106 directly to stop sending electronic bills to the consumer 100. At step V2, the consumer 100 notifies the biller 106 direct to stop electronic billing, specifying the consumer's customer account and electronic bill consumer mailbox address, which may be done via e-mail, regular mail, telephone or the like. Upon receipt of the notification from the consumer 100, the biller 106 verifies the consumer 100 and submits a request to the bill service provider 104 to stop electronic billing for the consumer 100 in step V4. The bill service provider 104 receives the request, changes the billing method for the consumer 100 to paper bills, logs the billing method change, sends a request to the commerce document server 108 to stop electronic billing, specifying the consumer 100 and the biller 106, and returns acknowledgment of the request to stop electronic billing for the consumer 100 to the biller 106 at V6. The commerce document server 108 receives and logs the request to stop electronic billing from the specified biller 106 to the consumer 100, marks all undelivered bills in the consumer mailbox from the specified biller 106 as stopped, logs rejected bill delivery stopped, and sends a notice that electronic billing from the biller 106 to the consumer 100 will be stopped to the consumer service provider 102 in step V8. At step V10, the consumer service provider 102 receives the notice, marks the biller 106 as stopped in the consumer's list of electronic billers, logs receipt of the notification, and sends notice that electronic billing will stop from the biller 106 to the consumer 100. Alternatively, the commerce document server 108 may notify the consumer 100 via e-mail.

Figure 28:
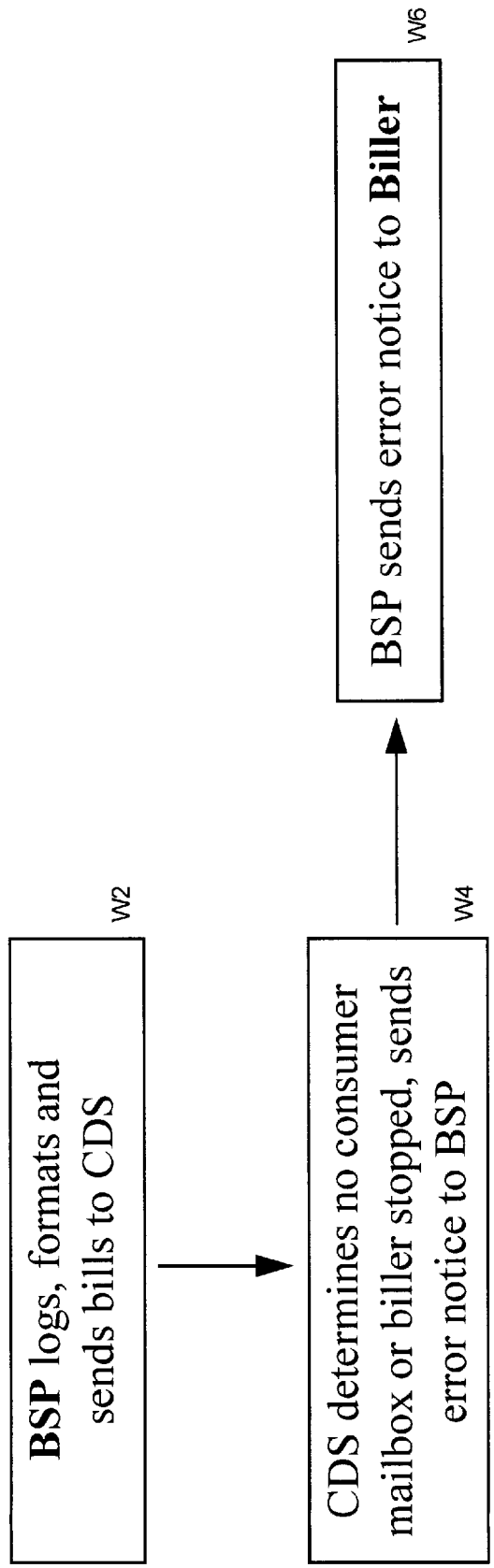
FIG. 28 is a flow chart which provides further detail regarding the process of reporting an electronic billing error to the biller for an embodiment of the present invention.

FIG. 28 is a flow chart providing further detail regarding the process of reporting a consumer mailbox error or stoppage of electronic billing from the biller 106 to the consumer 100. When the biller 106 has submitted a bill to the bill service provider 104 which cannot be delivered to the consumer 100 because the consumer mailbox address is incorrect or electronic billing to the consumer 100 has been stopped, bill delivery for the consumer 100 is rejected. For example, when the commerce document server 108 receives packaged bills, including bill content request, from the bill service provider 104 at step W2, the commerce document server 108, while storing the bills by consumer mailbox, may be unable to find the appropriate consumer mailbox for the consumer 100, or may find that electronic billing for the consumer 100 was stopped. At step W4, the commerce document server 108 logs the error status and sends acknowledgment of receipt with the error status of the bill that could not be delivered, and with the reason specified, to the bill service provider 104. The bill service provider 104 receives and logs the error status, marks the bill status as undelivered, investigates the problem, and if necessary, corrects the consumer mailbox address and retransmits the bill to the commerce document server 108. If the bill still cannot be delivered the bill service provider 104 sends notice to the biller 106 at step W6, so the biller 106 can investigate and notify the consumer 100 direct if deemed necessary.

FIG. 29 is a flow chart providing further detail regarding the process of stopping bill presentment for bills from the biller 106 to the consumer 100. The consumer 100 can request at any time to stop electronic bill presentment, in which case all bills currently stored for the consumer 100 will no longer be accessible. At step X2, the consumer 100 sends a request to the consumer service provider 102 to stop electronic bill presentment with an effective date. The consumer service provider 102 receives the request and may warn the consumer 100 if there are undelivered bills. Upon receipt of the warning, the consumer 100 may request download of historical data. At step X4, the consumer service provider 102 sends a request to the commerce document server 108 to stop electronic billing and may also specify download of historical data, if requested by the consumer 100. Upon receipt of the request, the commerce document server 108 logs electronic billing stopped for the consumer 100, marks all undelivered bills in the consumer mailbox as stopped, logs rejected bill delivery stopped, initiates download of historical data if requested for the consumer 100, and sends a stop electronic billing response to the consumer service provider 102 at step X6. The consumer service provider 102 receives the response and sends a bill presentment service deactivation request to the commerce document server 108 in step X8. Upon receipt of the deactivation request, the commerce document server 108 deactivates bill presentment service for the consumer 100, sends a deactivation response to the consumer service provider 102, and for each electronic biller, notifies the bill service provider 104 of rejected or stopped bill delivery for each bill, at step X10. The bill service provider 104 receives the notice, logs bills undelivered, logs electronic billing stopped for the consumer 100, switches billing method to paper billing, and sends a notice to the biller 106 that electronic billing is stopped for the consumer 100 and whether there are undelivered bills, at X12. The consumer service provider 102 likewise receives the deactivation response from the commerce document server 108 and sends a stop acknowledgment of electronic billing to the consumer 100, in step X14.

FIG. 30 schematically illustrates a version of the bill template 200 provided by the biller 106 and stored by the bill service provider 104 which describes the look and feel of the bill, including statement content, routing information and tracking information. FIG. 31 schematically illustrates a version of the enclosure template 202 likewise provided by the biller 106 and stored by the bill service provider 104 which is the electronic equivalent of a paper insert mailed with paper bills to communicate information and marketing offers to the consumer 100 from the biller 106. The bill consists of three main components, namely, contents, enclosures and format. The components of the bill conform to the bill presentment format or bill definition language. As illustrated in FIG. 30, the format of the contents are described by the bill template 200, and it may be different for each consumer. Enclosures may be added to the bill, in which case, their format is described by the enclosure template 202, as illustrated in FIG. 31. Billing data and remittance information may be part of the same bill or may be separate and linked by a globally unique bill ID.

FIG. 32 is a table illustrating the layered approach to standards employed in the system of the present invention, which easily accommodates new evolving standards without impact on the overall architecture and system design. The standards are layered on top of one another, each independent of the choice of lower standards. For example, standards such as payment protocols and security are layered on top of and independent of the particular transport used. In other words, payment protocol and security can be used over the internet, telephone lines, or ATM machine networks. Further, when there are multiple possible standards, such as for digital signatures, the protocol is designed to allow the interacting parties to indicate the choice of protocol. The default assumes the most prevalent protocol. Referring to FIG. 32, interaction 204 between the consumer 100 and the consumer service provider 102 is by means of one or more of the worldwide web, electronic mail, ATM machines, personal financial modules, home PC banking software, telephone, and paper bills. Regarding bill presentment and payment 206, bill payment may be made by one or more of credit cards, debit cards, checks, automatic clearing house (ACH), electronic checks, and electronic cash, and bill presentment makes use of banking industry technology secretariat standards and requirements (BITS). Financial data interchange 208 utilizes one or more of financial services markup language (FSML), banking industry technology secretariat standards and requirements (BIPS), network payment protocol (NPP), and bill definition language. Content display 210 makes use of hypertext markup language/extended markup language (HTML/XML). Security 212 utilizes one or more of the widely adopted X-509 public key certificate syntax for certificates and PKS #7 standard for digital signatures. Directory access application 214 involves use of one or more of directory-lightweight directory access protocol (LDAP), hypertext transfer protocol (HTTP), financial transactions protocol (FTP), post office protocol/internet message access protocol (POP/IMAP), simple mail transfer protocol (SMTP), secure multipurpose internet mail extensions (S/MIME), and secure sockets layer (SSL). The communication medium 216 used is the internet and/or dedicated communication/data lines, and transport 218 makes use of transmission control protocol/internet protocol (TCP/IP).

It should be noted that the processes and methods described herein with reference to various flow charts illustrating various steps are implemented by computer components. Accordingly, each such step typically generates an electrical signal which represents a result of the particular step in the illustrated flow charts. Accordingly, the flow charts represent electrical signals which are generated and used in subsequent steps.

Various preferred embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the present invention. Accordingly, the invention is only limited by the following claims.

What is claimed is:

1. A method of presenting at least one bill for a consumer from a biller on a network, comprising
    preparing a bill file for at least one bill for the consumer from the biller, the bill file including data;
    automatically formatting the bill for the consumer using the data from the bill file;
    automatically storing the formatted bill for the consumer in a storage location;
    providing access for the consumer to the storage location;
    wherein preparing the bill further comprises the consumer transmitting a request for the bill;
    wherein the request is communicated by the consumer to a consumer account of consumer service provider;
    the consumer service provider transmitting the request to a biller;
    wherein transmitting the request further comprises transmitting a request for bill presentment for the consumer to the consumer service provider;
    creating the consumer account for the consumer by the consumer service provider; and
    the consumer transmitting a request to the consumer service provider for transfer to a new consumer service provider.

2. The method of claim 1, further comprising the consumer service provider transmitting the request to the bill service provider.

3. A system for electronic bill presentment, comprising:
    a server of a bill service provider the server of the bill service provider hosting a biller account for receiving a bill file from the biller that includes bill data and for automatically formatting a bill from the bill data for a consumer;
    a document server coupled to the bill service provider server, the document server receiving and automatically storing the formatted bill;
    a consumer terminal coupled to the document server for accessing and displaying the stored bills;
    means for receiving a request for action on the bill for the consumer;
    means for generating a payment coupon for the bill;
    means for storing the payment coupon for the biller by the bill service provider;
    means for receiving notice of receipt of the payment coupon for the biller by the document server via the bill service provider; and
    means for updating a bill payment indicator for the receipt of the payment coupon for the biller by the document server.

4. The system of claim 3, wherein the consumer terminal is coupled to the document server over an electronic network connection.

5. The system of claim 3, wherein the server of the bill service provider comprises a computer.

6. The system of claim 3, wherein server of the bill service provider comprises a personal computer.

7. The system of claim 3, further comprising a biller terminal coupled to the bill service provider server.

8. The system of claim 3, wherein the consumer terminal is a personal computer.

9. The system of claim 3, further comprising a bill payment processor coupled to the consumer terminal for processing payment of the bill for the consumer.

10. A method of electronic bill presentment, comprising:
    receiving a request for electronic bill presentment for a biller by a document server via a bill service provider;
    activating electronic bill presentment service for the biller by the document server;
    notifying the biller of activation of the service by the document server via the bill service provider;
    receiving a bill file by the bill service provider for at least one bill for a consumer from the biller;
    automatically formatting the bill for the consumer from the bill file;
    automatically storing the formatted bill for the consumer in a storage location;
    providing access for the consumer to the storage location;
    receiving a request for action on the bill for the consumer;

generating a payment coupon for the bill;

storing the payment coupon for the biller by the bill service provider;

receiving notice of receipt of the payment coupon for the biller by the document server via the bill service provider; and updating a bill payment indicator for the receipt of the payment coupon for the biller by the document server.

11. A method of electronic bill presentment, comprising:

receiving a bill file by a bill service provider for at least one bill for a consumer from a biller;

automatically formatting the bill for the consumer from the bill file;

automatically storing the bill for the consumer by a document server;

providing access for the consumer to the stored bill by the document server;

receiving a request for action on the bill for the consumer by a consumer service provider;

generating a payment coupon for the bill by the consumer service provider;

providing the payment coupon by the consumer service provider to a bill service provider for the biller via a document server;

storing the payment coupon for the biller by the bill service provider;

receiving notice of receipt of the payment coupon for the biller by the document server via the bill service provider; and updating a bill payment indicator for the receipt of the payment coupon for the biller by the document server.

* * * * *